(12) United States Patent
Shiokawa

(10) Patent No.: US 10,574,935 B2
(45) Date of Patent: Feb. 25, 2020

(54) PROJECTION OPTICAL SYSTEM AND PROJECTION TYPE IMAGE DISPLAY DEVICE

(71) Applicant: SEIKO EPSON CORPORATION, Tokyo (JP)

(72) Inventor: Koji Shiokawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/199,662

(22) Filed: Nov. 26, 2018

(65) Prior Publication Data

US 2019/0166329 A1    May 30, 2019

(30) Foreign Application Priority Data

Nov. 27, 2017    (JP) .................................. 2017-226534

(51) Int. Cl.

| | |
|---|---|
| *G03B 21/14* | (2006.01) |
| *H04N 5/74* | (2006.01) |
| *G02B 13/16* | (2006.01) |
| *G02B 13/06* | (2006.01) |
| *G02B 13/04* | (2006.01) |
| *G02B 27/14* | (2006.01) |
| *G02B 27/00* | (2006.01) |

(52) U.S. Cl.
CPC ........... *H04N 5/7416* (2013.01); *G02B 13/04* (2013.01); *G02B 13/06* (2013.01); *G02B 13/16* (2013.01); *G03B 21/142* (2013.01); *G02B 27/005* (2013.01); *G02B 27/149* (2013.01)

(58) Field of Classification Search
CPC ...... G02B 13/003; G02B 13/04; G02B 13/06; G02B 13/16; G02B 13/18; G02B 13/22; G02B 13/0035; G03B 21/006; G03B 21/008; G03B 21/28; G03B 21/53; G03B 21/142; G03B 21/147
See application file for complete search history.

(56) References Cited

U.S. PATENT DOCUMENTS

| | | |
|---|---|---|
| 7,009,765 B2 | 3/2006 | Gohman |
| 7,159,988 B2 | 1/2007 | Yatsu et al. |
| 7,261,420 B2 | 8/2007 | Yatsu et al. |
| 9,041,848 B2 | 5/2015 | Inoko |

(Continued)

FOREIGN PATENT DOCUMENTS

| | | |
|---|---|---|
| JP | 2005-157153 A | 6/2005 |
| JP | 2006-523318 A | 10/2006 |

(Continued)

*Primary Examiner* — Sultan Chowdhury
(74) *Attorney, Agent, or Firm* — Oliff PLC

(57) ABSTRACT

A projection optical system includes a first lens unit and a second lens unit interposing an intermediate image therebetween. The first lens unit includes two aspherical lenses (a first lens unit first lens and a first lens unit ninth lens), and a first lens unit cemented lens. The projection optical system satisfies the following Conditional Expressions (1) and (2) when the number of lens elements of the first lens unit and the number of lens elements of the second lens unit are set to be Num1 and Num2, respectively. In addition, refractive indexes and Abbe numbers of three lenses constituting the first lens unit cemented lens satisfy a predetermined conditional expression.

$$\text{Num2} \le 7 \tag{1}$$

$$1.5 \le \text{Num1}/\text{Num2} \le 2.5 \tag{2}$$

16 Claims, 13 Drawing Sheets

(56) References Cited

U.S. PATENT DOCUMENTS

| | | |
|---|---|---|
| 2004/0032653 A1 | 2/2004 | Gohman |
| 2004/0174611 A1* | 9/2004 | Hatakeyama .......... G02B 13/16 |
| | | 359/676 |
| 2005/0117123 A1 | 6/2005 | Yatsu et al. |
| 2007/0097327 A1 | 5/2007 | Yatsu et al. |
| 2014/0036142 A1 | 2/2014 | Inoko |
| 2014/0132790 A1* | 5/2014 | Takahashi ............ G02B 15/177 |
| | | 348/220.1 |
| 2017/0343779 A1* | 11/2017 | Nagahara ................ G02B 13/16 |
| 2018/0307041 A1* | 10/2018 | Masui ................ G02B 27/0081 |

FOREIGN PATENT DOCUMENTS

| | | |
|---|---|---|
| JP | 4734827 B2 | 7/2011 |
| JP | 2014-29392 A | 2/2014 |
| JP | 5871743 B2 | 3/2016 |

* cited by examiner

| LENS NUMBER | SURFACE NUMBER | RADIUS OF CURVATURE | d | nd | vd |
|---|---|---|---|---|---|
| SCREEN | 0 | INFINITY | A | | |
| L1 | *1 | -42.768 | 4.281 | 1.50943 | 55.88 |
| | *2 | 34.110 | B | | |
| L2 | 3 | 19.992 | 1.719 | 1.83481 | 42.73 |
| | 4 | 10.556 | 3.599 | | |
| L3 | 5 | 14.632 | 1.200 | 1.84666 | 23.78 |
| | 6 | 6.731 | 7.684 | | |
| L4 | 7 | -14.640 | 1.003 | 1.49701 | 81.55 |
| | 8 | -83.420 | 0.600 | | |
| L5 | 9 | 39.016 | 21.798 | 1.80610 | 33.27 |
| | 10 | -20.204 | C | | |
| L6 | 11 | 23.779 | 13.207 | 1.61801 | 63.33 |
| L7 | 12 | -16.000 | 1.100 | 1.85478 | 24.8 |
| L8 | 13 | 18.500 | 13.691 | 1.61801 | 63.33 |
| | 14 | -24.449 | 0.600 | | |
| L9 | *15 | 1363.512 | 6.060 | 1.50943 | 55.88 |
| | *16 | -22.790 | D | | |
| L10 | 17 | -85.044 | 4.766 | 1.84666 | 23.78 |
| | 18 | -40.984 | 6.417 | | |
| L11 | 19 | 118.543 | 4.200 | 1.80610 | 33.27 |
| | 20 | -138.159 | 41.350 | | |
| DIAPHRAGM | 21 | 1.000E+18 | 2.819 | | |
| L12 | 22 | 236.132 | 0.800 | 1.84666 | 23.78 |
| L13 | 23 | 13.359 | 6.749 | 1.69680 | 55.53 |
| | 24 | -50.885 | 15.281 | | |
| L14 | 25 | 35.289 | 4.942 | 1.80610 | 33.27 |
| | 26 | -57.392 | 5.000 | | |
| | 27 | INFINITY | 25.000 | 1.51681 | 64.2 |
| LIQUID CRYSTAL PANEL | 28 | INFINITY | 0.769 | | |

FIG. 3

| SURFACE NUMBER | 1 | 2 |
|---|---|---|
| Y RADIUS OF CURVATURE | -42.768 | 34.11 |
| CONIC CONSTANT | -44.444 | 0.774 |
| THIRD-ORDER ASPHERICAL COEFFICIENT | 6.33747E-04 | 1.00525E-03 |
| FOURTH-ORDER ASPHERICAL COEFFICIENT | 2.24318E-05 | -1.77095E-05 |
| FIFTH-ORDER ASPHERICAL COEFFICIENT | -2.64898E-06 | -8.27105E-07 |
| SIXTH-ORDER ASPHERICAL COEFFICIENT | 5.20546E-08 | -1.45144E-08 |
| SEVENTH-ORDER ASPHERICAL COEFFICIENT | 2.10256E-09 | 3.23725E-10 |
| EIGHTH-ORDER ASPHERICAL COEFFICIENT | -5.81400E-11 | -6.68580E-12 |
| NINTH-ORDER ASPHERICAL COEFFICIENT | -7.74037E-13 | 2.51179E-12 |
| TENTH-ORDER ASPHERICAL COEFFICIENT | 6.01602E-15 | -7.67854E-14 |
| ELEVENTH-ORDER ASPHERICAL COEFFICIENT | 1.26308E-16 | 2.29440E-15 |
| TWELFTH-ORDER ASPHERICAL COEFFICIENT | -1.03553E-17 | -2.23146E-16 |
| THIRTEENTH-ORDER ASPHERICAL COEFFICIENT | 1.16589E-18 | -5.80628E-18 |
| FOURTEENTH-ORDER ASPHERICAL COEFFICIENT | 3.63004E-20 | 2.43105E-19 |
| FIFTEENTH-ORDER ASPHERICAL COEFFICIENT | -1.34003E-21 | 2.39013E-20 |
| SIXTEENTH-ORDER ASPHERICAL COEFFICIENT | -3.29438E-24 | -2.12078E-22 |
| SEVENTEENTH-ORDER ASPHERICAL COEFFICIENT | -1.35075E-24 | -1.52441E-23 |
| EIGHTEENTH-ORDER ASPHERICAL COEFFICIENT | 3.88789E-26 | -1.71035E-25 |

| SURFACE NUMBER | S15 | S16 |
|---|---|---|
| Y RADIUS OF CURVATURE | 1363.512 | -22.79 |
| CONIC CONSTANT (K) | 0 | -1.19 |
| FOURTH-ORDER COEFFICIENT (A) | 1.54179E-05 | 1.20032E-04 |
| SIXTH-ORDER COEFFICIENT (B) | -7.90583E-07 | -9.83579E-07 |
| EIGHTH-ORDER COEFFICIENT (C) | 5.06371E-10 | 5.06257E-10 |
| TENTH-ORDER COEFFICIENT (D) | -1.98066E-13 | 1.34858E-11 |
| TWELFTH-ORDER COEFFICIENT (E) | 9.45894E-15 | -1.99229E-14 |
| FOURTEENTH-ORDER COEFFICIENT (F) | 7.93456E-17 | -1.09294E-16 |
| SIXTEENTH-ORDER COEFFICIENT (G) | 3.11769E-19 | 4.09123E-20 |
| EIGHTEENTH-ORDER COEFFICIENT (H) | 3.16907E-21 | 2.52327E-21 |
| TWENTIETH-ORDER COEFFICIENT (J) | -1.96732E-23 | -5.06858E-24 |

FIG. 4

| LENS NUMBER | SURFACE NUMBER | RADIUS OF CURVATURE | d | nd | vd |
|---|---|---|---|---|---|
| SCREEN | 0 | INFINITY | A | | |
| L1 | *1 | -39.511 | 4 | 1.50943 | 55.88 |
| | *2 | 28.981 | B | | |
| L2 | 3 | 22.723 | 2 | 1.85150 | 40.78 |
| | 4 | 12.172 | 3.952 | | |
| L3 | 5 | 18.756 | 1.6 | 1.83481 | 42.73 |
| | 6 | 7.528 | 9.986 | | |
| L4 | 7 | -11.82 | 3.059 | 1.49701 | 81.55 |
| | 8 | -44.242 | 0.2 | | |
| L5 | 9 | 38.091 | 14.892 | 1.83400 | 37.35 |
| | 10 | -23.834 | C | | |
| L6 | 11 | 27.886 | 10.159 | 1.62300 | 58.17 |
| L7 | 12 | -14.798 | 1.2 | 1.80518 | 25.43 |
| L8 | 13 | 18.395 | 8.068 | 1.49701 | 81.55 |
| | 14 | -63.944 | 0.2 | | |
| L9 | 15 | 20.549 | 7.704 | 1.53776 | 74.7 |
| | 16 | 74.124 | 7.659 | | |
| L10 | *17 | 92.78 | 4.153 | 1.50943 | 55.88 |
| | *18 | -14.937 | D | | |
| L11 | 19 | 206.53 | 8.172 | 1.92286 | 20.88 |
| | 20 | -77.342 | 32.989 | | |
| L12 | *21 | 50.234 | 5.182 | 1.58314 | 59.39 |
| | *22 | -192.298 | 21.487 | | |
| DIAPHRAGM | 23 | 1E+18 | 7.11 | | |
| L13 | 24 | -40.98 | 2.069 | 1.92286 | 20.88 |
| L14 | 25 | 17.094 | 4.988 | 1.80400 | 46.58 |
| | 26 | -33.279 | 17.21 | | |
| L15 | 27 | 29.016 | 4.43 | 1.92286 | 20.88 |
| | 28 | -337.715 | 5 | | |
| | 29 | INFINITY | 23 | 1.51681 | 64.2 |
| LIQUID CRYSTAL PANEL | 30 | INFINITY | 2.1 | | |

FIG. 7

| SURFACE NUMBER | 1 | 2 | SURFACE NUMBER | 17 | 18 |
|---|---|---|---|---|---|
| Y RADIUS OF CURVATURE | -39.511 | 28.981 | Y RADIUS OF CURVATURE | 92.78 | -14.937 |
| CONIC CONSTANT | -91.515 | 0.462 | CONIC CONSTANT (K) | 43.415 | -2.612 |
| THIRD-ORDER ASPHERICAL COEFFICIENT | 6.28781E-04 | 1.42625E-03 | FOURTH-ORDER COEFFICIENT (A) | 6.07575E-05 | 1.71828E-04 |
| FOURTH-ORDER ASPHERICAL COEFFICIENT | 2.14571E-05 | -8.36236E-06 | SIXTH-ORDER COEFFICIENT (B) | -8.42803E-07 | -8.84532E-07 |
| FIFTH-ORDER ASPHERICAL COEFFICIENT | -2.64839E-06 | -1.13946E-06 | EIGHTH-ORDER COEFFICIENT (C) | 6.19956E-10 | 6.26930E-10 |
| SIXTH-ORDER ASPHERICAL COEFFICIENT | 5.21918E-08 | -2.82927E-08 | TENTH-ORDER COEFFICIENT (D) | 1.02339E-12 | 1.52713E-11 |
| SEVENTH-ORDER ASPHERICAL COEFFICIENT | 2.10344E-09 | 2.53983E-10 | TWELFTH-ORDER COEFFICIENT (E) | 1.38716E-14 | -1.24809E-14 |
| EIGHTH-ORDER ASPHERICAL COEFFICIENT | -5.83433E-11 | -2.59061E-11 | FOURTEENTH-ORDER COEFFICIENT (F) | 8.11542E-17 | -8.08712E-17 |
| NINTH-ORDER ASPHERICAL COEFFICIENT | -7.87832E-13 | 4.70181E-12 | SIXTEENTH-ORDER COEFFICIENT (G) | 2.99390E-19 | 5.99104E-20 |
| TENTH-ORDER ASPHERICAL COEFFICIENT | 5.57229E-15 | -1.80652E-13 | EIGHTEENTH-ORDER COEFFICIENT (H) | 3.14878E-21 | 2.47568E-21 |
| ELEVENTH-ORDER ASPHERICAL COEFFICIENT | 1.09868E-16 | 5.31371E-15 | TWENTIETH-ORDER COEFFICIENT (J) | -3.05180E-23 | -8.00199E-24 |
| TWELFTH-ORDER ASPHERICAL COEFFICIENT | -1.04794E-17 | -5.72513E-16 | SURFACE NUMBER | 21 | 22 |
| THIRTEENTH-ORDER ASPHERICAL COEFFICIENT | 1.18745E-18 | -1.55867E-17 | Y RADIUS OF CURVATURE | 50.234 | -192.298 |
| FOURTEENTH-ORDER ASPHERICAL COEFFICIENT | 3.74027E-20 | 7.79195E-19 | CONIC CONSTANT (K) | 0 | 0 |
| FIFTEENTH-ORDER ASPHERICAL COEFFICIENT | -1.31308E-21 | 8.04129E-20 | FOURTH-ORDER COEFFICIENT (A) | 2.45604E-07 | 2.24138E-06 |
| SIXTEENTH-ORDER ASPHERICAL COEFFICIENT | -3.14398E-24 | -6.98479E-22 | SIXTH-ORDER COEFFICIENT (B) | 6.87561E-09 | 4.06599E-09 |
| SEVENTEENTH-ORDER ASPHERICAL COEFFICIENT | -1.37184E-24 | -5.87139E-23 | EIGHTH-ORDER COEFFICIENT (C) | 1.61427E-12 | 1.48376E-11 |
| EIGHTEENTH-ORDER ASPHERICAL COEFFICIENT | 3.80572E-26 | -8.89168E-25 | TENTH-ORDER COEFFICIENT (D) | 1.57786E-14 | -1.96578E-14 |

FIG. 8

| LENS NUMBER | SURFACE NUMBER | RADIUS OF CURVATURE | d | nd | νd |
|---|---|---|---|---|---|
| SCREEN | 0 | INFINITY | A | | |
| L1 | *1 | -42.171 | 4.046 | 1.50943 | 55.88 |
| | *2 | 34.552 | B | | |
| L2 | 3 | 19.609 | 1.205 | 1.83481 | 42.73 |
| | 4 | 8.879 | 2.682 | | |
| L3 | 5 | 11.990 | 1.100 | 1.84666 | 23.78 |
| | 6 | 6.092 | 7.862 | | |
| L4 | 7 | -9.849 | 1.819 | 1.49701 | 81.55 |
| | 8 | -14.657 | 0.200 | | |
| L5 | 9 | 643.357 | 13.652 | 1.80610 | 33.27 |
| | 10 | -15.353 | C | | |
| L6 | 11 | 21.950 | 9.038 | 1.61801 | 63.33 |
| L7 | 12 | -15.000 | 1.100 | 1.85478 | 24.8 |
| L8 | 13 | 15.000 | 9.644 | 1.61801 | 63.33 |
| | 14 | -22.829 | 2.017 | | |
| L9 | *15 | -33.405 | 3.787 | 1.50943 | 55.88 |
| | *16 | -11.113 | D | | |
| L10 | 17 | -67.359 | 6.472 | 1.84666 | 23.78 |
| | 18 | -36.594 | 16.006 | | |
| L11 | 19 | 92.175 | 6.652 | 1.80610 | 33.27 |
| | 20 | -139.896 | 34.272 | | |
| DIAPHRAGM | 21 | INFINITY | 10.966 | | |
| L12 | 22 | -123.649 | 0.800 | 1.84666 | 23.78 |
| L13 | 23 | 16.059 | 5.029 | 1.69681 | 55.53 |
| | 24 | -38.895 | 24.733 | | |
| L14 | 26 | 34.722 | 5.170 | 1.80610 | 33.27 |
| | 27 | -91.551 | 5.000 | | |
| | 28 | INFINITY | 23.000 | 1.51681 | 64.2 |
| LIQUID CRYSTAL PANEL | 29 | INFINITY | 6.099 | | |

FIG. 11

| SURFACE NUMBER | 1 | 2 |
|---|---|---|
| Y RADIUS OF CURVATURE | -42.171 | 34.552 |
| CONIC CONSTANT | -44.669 | 0.733 |
| THIRD-ORDER ASPHERICAL COEFFICIENT | 6.23382E-04 | 9.76089E-04 |
| FOURTH-ORDER ASPHERICAL COEFFICIENT | 2.19763E-05 | -1.88452E-05 |
| FIFTH-ORDER ASPHERICAL COEFFICIENT | -2.65620E-06 | -7.65296E-07 |
| SIXTH-ORDER ASPHERICAL COEFFICIENT | 5.20964E-08 | -1.24197E-08 |
| SEVENTH-ORDER ASPHERICAL COEFFICIENT | 2.10904E-09 | 3.35008E-10 |
| EIGHTH-ORDER ASPHERICAL COEFFICIENT | -5.79911E-11 | -4.40910E-12 |
| NINTH-ORDER ASPHERICAL COEFFICIENT | -7.74595E-13 | 2.20562E-12 |
| TENTH-ORDER ASPHERICAL COEFFICIENT | 5.80050E-15 | -6.38005E-14 |
| ELEVENTH-ORDER ASPHERICAL COEFFICIENT | 1.17301E-16 | 1.93053E-15 |
| TWELFTH-ORDER ASPHERICAL COEFFICIENT | -1.06544E-17 | -1.82395E-16 |
| THIRTEENTH-ORDER ASPHERICAL COEFFICIENT | 1.16227E-18 | -4.67847E-18 |
| FOURTEENTH-ORDER ASPHERICAL COEFFICIENT | 3.64488E-20 | 1.91348E-19 |
| FIFTEENTH-ORDER ASPHERICAL COEFFICIENT | -1.33019E-21 | 1.85522E-20 |
| SIXTEENTH-ORDER ASPHERICAL COEFFICIENT | -3.01381E-24 | -1.63467E-22 |
| SEVENTEENTH-ORDER ASPHERICAL COEFFICIENT | -1.34978E-24 | -1.14941E-23 |
| EIGHTEENTH-ORDER ASPHERICAL COEFFICIENT | 3.85422E-26 | -1.24890E-25 |

| SURFACE NUMBER | 15 | 16 |
|---|---|---|
| Y RADIUS OF CURVATURE | -33.405 | -11.113 |
| CONIC CONSTANT (K) | 0 | -1.72 |
| FOURTH-ORDER COEFFICIENT (A) | 6.88321E-05 | 1.66997E-04 |
| SIXTH-ORDER COEFFICIENT (B) | -8.87163E-07 | -7.68304E-07 |
| EIGHTH-ORDER COEFFICIENT (C) | 1.61906E-09 | 4.54908E-10 |
| TENTH-ORDER COEFFICIENT (D) | 7.66398E-12 | 1.32539E-11 |
| TWELFTH-ORDER COEFFICIENT (E) | 4.02393E-14 | -1.63179E-15 |
| FOURTEENTH-ORDER COEFFICIENT (F) | 1.72711E-16 | 1.29666E-17 |
| SIXTEENTH-ORDER COEFFICIENT (G) | 3.11769E-19 | 4.09123E-20 |
| EIGHTEENTH-ORDER COEFFICIENT (H) | 3.16907E-21 | 2.52327E-21 |
| TWENTIETH-ORDER COEFFICIENT (J) | -2.61072E-23 | 1.83952E-23 |

FIG. 12

PROJECTION OPTICAL SYSTEM AND PROJECTION TYPE IMAGE DISPLAY DEVICE

BACKGROUND

1. Technical Field

The present invention relates to a projection optical system capable of suppressing the number of lens elements, and a projection type image display device including the projection optical system.

2. Related Art

A projection optical system capable of being incorporated into a projection type image display device such as a projector is disclosed in JP-A-2014-29392. When the projection optical system is incorporated into the projection type image display device, the projection optical system disclosed in the document forms an intermediate image of an image of the image display element inside the optical system to form the image on a screen again. That is, the projection optical system includes a first lens unit that conjugates the screen (enlargement-side image forming surface) and the intermediate image and a second lens unit that conjugates the intermediate image and a reduction-side image forming surface (the image of the image display element).

In such a projection optical system, it is desirable to suppress the number of lens elements in order to suppress the manufacturing cost or shorten the total length.

SUMMARY

An advantage of some aspects of the invention is to provide a projection optical system which is easy to suppress the number of lens elements. Another advantage of some aspects of the invention is to provide a projection type image display device having the projection optical system incorporated thereinto.

A projection optical system according to an aspect of the invention includes a first lens unit that conjugates an enlargement-side image forming surface positioned on an enlargement side and an intermediate image, and a second lens unit that conjugates the intermediate image and a reduction-side image forming surface positioned on a reduction side, in which wherein the first lens unit includes at least two aspherical lenses and a cemented lens formed by bonding three lenses to each other, the cemented lens includes a first positive lens, a negative lens, and a second positive lens toward a side of the intermediate image from a side of the enlargement-side image forming surface, and all of the following Conditional Expression (1) to Conditional Expression (6) are satisfied when the number of lens elements of the first lens unit is set to be Num1, the number of lens elements of the second lens unit is set to be Num2, a refractive index of the first positive lens is set to be n1, an Abbe number of the first positive lens is set to be vd1, a refractive index of the negative lens is set to be n2, an Abbe number of the negative lens is set to be vd2, a refractive index of the second positive lens is set to be n3, and an Abbe number of the second positive lens is set to be vd3.

$$Num2 \leq 7 \quad (1)$$

$$1.5 \leq Num1/Num2 \leq 2.5 \quad (2)$$

$$n2-n1>0.15 \quad (3)$$

$$n2-n3>0.2 \quad (4)$$

$$vd1-vd2>30 \quad (5)$$

$$vd3-vd2>30 \quad (6)$$

Since the aspect of the invention satisfies Conditional Expression (1), an upper limit of the number of lens elements of the second lens unit is specified. Therefore, it is easy to suppress the number of lens elements of the second lens unit. In addition, Conditional Expression (1) and Conditional Expression (2) are satisfied, and thus an upper limit of the number of lens elements of the whole lens system of the projection optical system is specified. Accordingly, it is easy to suppress the number of lens elements and the total length of the whole lens system. In addition, Conditional Expression (2) is satisfied, and thus the number of elements of the first lens unit becomes larger than that of the second lens unit. Therefore, it becomes easy to correct curvature of field and distortion aberration, occurring on the second lens unit, on the first lens unit side by suppressing the number of lens elements of the second lens unit. In addition, the first lens unit includes at least two aspherical lenses, and thus it is easy to correct aberration, occurring on the second lens unit side, on the first lens unit side. Further, the first lens unit includes the cemented lens formed by bonding three lenses to each other, and thus refractive indexes of the three lenses constituting the cemented lens satisfy Conditional Expression (3) and Conditional Expression (4), and Abbe numbers of the three lenses constituting the cemented lens satisfy Conditional Expression (5) and Conditional Expression (6). Here, when the refractive indexes and the Abbe numbers of the three lenses constituting the cemented lens satisfy Conditional Expression (3) to Conditional Expression (6), it is possible to satisfactorily correct magnification chromatic aberration. In addition, when the cemented lens formed by bonding the three lenses to each other is provided, it is possible to prevent eccentricity and collapse of each lens element as compared with a case where the three lenses are disposed individually. Thereby, it is possible to suppress eccentric occurrence of blur and flare.

In the aspect of the invention, it is preferable that a minimum effective diameter lens having a smallest lens effective diameter, among the lens elements of the first lens unit, is a negative lens having a concave surface on the side of the enlargement-side image forming surface, and the following Conditional Expression (7) is satisfied when a focal length of the first lens unit is set to be f1U and a focal length of the minimum effective diameter lens is set to be f2.

$$-50 < f2/f1U < -5 \quad (7)$$

When the minimum effective diameter lens within the first lens unit is set to be a negative lens having a concave surface on the side of the enlargement-side image forming surface, it becomes easy to take in a required amount of light while suppressing the increase of the total length of the second lens unit and a lens diameter of each lens element constituting the second lens unit. In addition, when Conditional Expression (7) is satisfied, it becomes easy to suppress performance deterioration during focusing while suppressing the increase of the lens diameter of the minimum effective diameter lens. That is, when Conditional Expression (7) exceeds a lower limit, the lens diameter of the minimum effective diameter lens is increased in order to take in a required amount of light. In addition, when Conditional Expression (7) exceeds the lower limit, a fluctuation in astigmatism tends to be increased during focusing. When Conditional Expression (7) exceeds an upper limit, it becomes difficult to correct the surrounding coma aberration.

In the aspect of the invention, it is preferable that a principal ray of an off-axis light beam between the second lens unit and the first lens unit approaches an optical axis toward the first lens unit side from the second lens unit side. In this manner, it is easy to correct distortion aberration, occurring on the first lens unit side, on the second lens unit side.

In the aspect of the invention, it is preferable that a focusing position of off-axis light in the intermediate image approaches the second lens unit outward an axis. In this manner, it is easy to correct distortion aberration, occurring on the first lens unit side, on the second lens unit side.

In the aspect of the invention, it is preferable that the first lens unit includes two aspherical lenses, and the two aspherical lenses are made of a resin and are respectively disposed on the first lens unit side closest to the side of the enlargement-side image forming surface and on the first lens unit side closest to the side of the intermediate image. It becomes easy to correct distortion aberration by disposing the aspherical lens on the side of the first lens unit closest to the enlargement-side image forming surface. In addition, it becomes easy to correct curvature of field by disposing the aspherical lens on the side of the first lens unit closest to the intermediate image. In addition, when the two aspherical lenses are made of a resin, it is possible to suppress the manufacturing cost of the projection optical system as compared with a case where a glass lens is used.

In the aspect of the invention, in order to bring the enlargement-side image forming surface into focus when a size of projection onto the enlargement-side image forming surface is changed, the projection optical system may further include a first moving lens group that is positioned next to a first lens unit first lens positioned closest to the side of the enlargement-side image forming surface among the lens elements of the first lens unit, and a second moving lens group that is positioned next to the first moving lens group on the side of the intermediate image of the first moving lens group, the first moving lens group includes two or more negative lenses from the first lens unit first lens side, the second moving lens group includes at least one positive lens, and focusing is performed by fixing the first lens unit first lens and relatively moving the first moving lens group and the second moving lens group on an optical axis when the size of projection onto the enlargement-side image forming surface is changed.

In the aspect of the invention, it is preferable that an intermediate image-side lens positioned closest to the side of the intermediate image and a reduction-side image forming surface-side lens positioned closest to the side of the reduction-side image forming surface, among the lens elements of the second lens unit, are positive lenses, and all of the following Conditional Expression (8) to Conditional Expression (10) are satisfied when refractive indexes of lines d of the intermediate image-side lens and the reduction-side image forming surface-side lens are respectively set to be nc1 and nc2 and a partial dispersion ratio of the reduction-side image forming surface-side lens is set to be θg,F.

$$nc1 > 1.8 \quad (8)$$

$$nc2 > 1.8 \quad (9)$$

$$\theta g, F > 0.58 \quad (10)$$

The refractive indexes of the intermediate image-side lens and the reduction-side image forming surface-side lens are set to be relatively high by satisfying Conditional Expression (8) and Conditional Expression (9). Therefore, even when the number of lens elements of the second lens unit is reduced, it is easy to form the intermediate image. Here, in a case where the refractive indexes of the intermediate image-side lens and the reduction-side image forming surface-side lens are increased, chromatic aberration tends to occur in the second lens unit. On the other hand, when the partial dispersion ratio of the reduction-side image forming surface-side lens is specified so as to satisfy Conditional Expression (10), it becomes easy to suppress the occurrence of magnification chromatic aberration and axial chromatic aberration in the second lens unit.

In the aspect of the invention, in order to constitute a wide-angle lens system having a long back focus, it is preferable that the following Conditional Expression (11) is satisfied when an absolute value of a focal length of d-line of a whole lens system is set to be |f| and a back focus air-converted value is set to be BF.

$$BF/|f| > 6 \quad (11)$$

A projection type image display device according to another aspect of the invention includes the projection optical system described above and an image display element that displays an image on the reduction-side image forming surface.

According to the aspect of the invention, it is possible to suppress the number of lens elements while correcting aberration in the projection optical system. In addition, when the number of lens elements of the projection optical system can be suppressed, it is possible to suppress the manufacturing cost of the projection optical system, and thus it becomes easy to suppress the manufacturing cost of the projection type image display device.

BRIEF DESCRIPTION OF THE DRAWINGS

The invention will be described with reference to the accompanying drawings, wherein like numbers reference like elements.

FIG. 3 is a diagram illustrating lens data of the projection optical system according to Example 1.

FIG. 4 is a diagram illustrating aspherical data of an aspherical lens of the projection optical system according to Example 1.

FIG. 7 is a diagram illustrating lens data of the projection optical system according to Example 2.

FIG. 8 is a diagram illustrating aspherical data of an aspherical lens of the projection optical system according to Example 2.

FIG. 11 is a diagram illustrating lens data of the projection optical system according to Example 3.

FIG. 12 is a diagram illustrating aspherical data of an aspherical lens of the projection optical system according to Example 3.

DESCRIPTION OF EXEMPLARY EMBODIMENTS

Hereinafter, a projection optical system according to an exemplary embodiment of the invention and a projection type image display device including the projection optical system will be described in detail.

Projection Type Image Display Device

Figure 1:
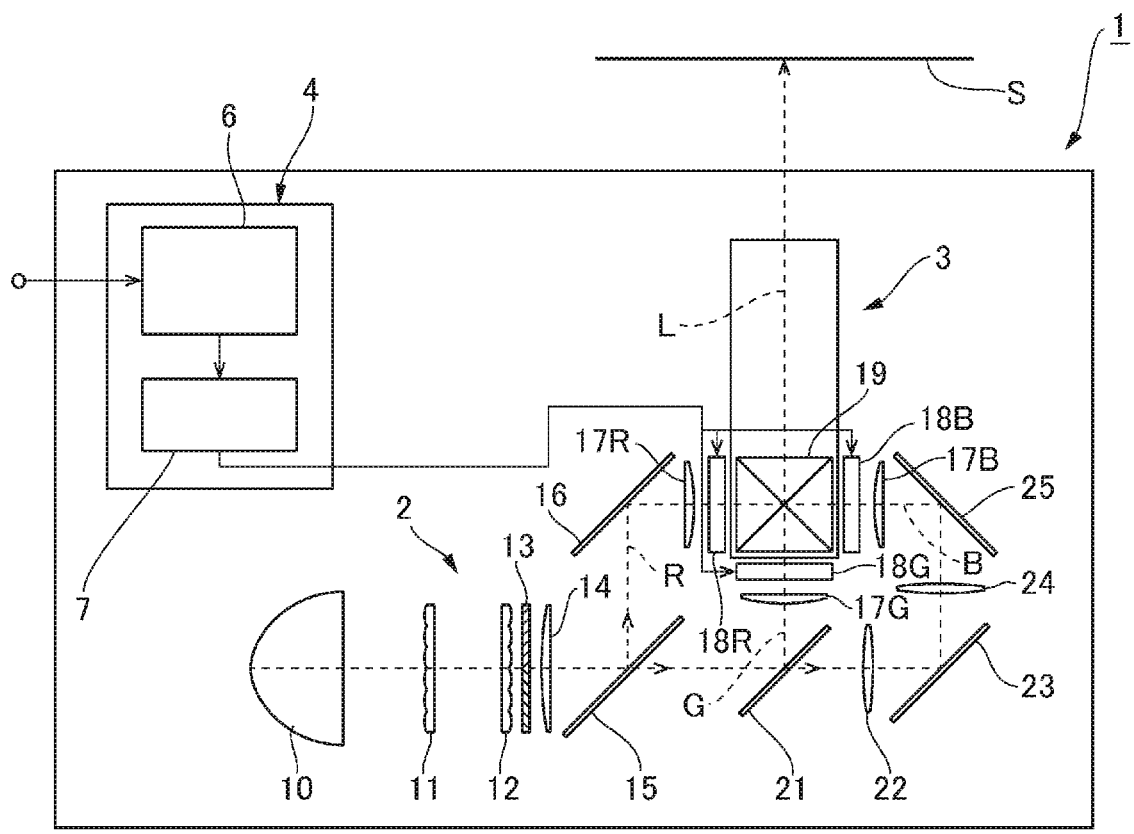
FIG. 1 is a diagram illustrating a schematic configuration of a projection type image display device including a projection optical system according to the invention.

FIG. 1 is a diagram illustrating a schematic configuration of a projector including a projection optical system according to the invention. As illustrated in FIG. 1, a projector (projection type image display device) 1 includes an image light generation optical system 2 that generates image light to be projected onto a screen S, a projection optical system 3 that projects the image light in an enlarged manner, and a control unit 4 that controls the operation of the image light generation optical system 2.

Image Light Generation Optical System and Control Unit

The image light generation optical system 2 includes a light source 10, a first integrator lens 11, a second integrator lens 12, a polarization conversion element 13, and a superimposing lens 14. The light source 10 is constituted by, for example, an ultra-high pressure mercury lamp, a solid light source, or the like. Each of the first integrator lens 11 and the second integrator lens 12 includes a plurality of lens elements arranged in an array. The first integrator lens 11 divides light flux received from the light source 10 into a plurality of pieces. Each of the lens elements of the first integrator lens 11 condenses the light flux received from the light source 10 in the vicinity of each of the lens elements of the second integrator lens 12.

The polarization conversion element 13 converts light received from the second integrator lens 12 into predetermined linearly polarized light. The superimposing lens 14 superimposes an image of each of the lens elements of the first integrator lens 11 on display regions of a liquid crystal panel 18R, a liquid crystal panel 18G, and a liquid crystal panel 18B to be described later through the second integrator lens 12.

In addition, the image light generation optical system 2 includes a first dichroic mirror 15, a reflective mirror 16, a field lens 17R, and the liquid crystal panel 18R. The first dichroic mirror 15 reflects light R which is red light and a portion of a light beam incident from the superimposing lens 14, and transmits light G and light B which are portions of the light beam incident from the superimposing lens 14. The light R reflected from the first dichroic mirror 15 is incident on the liquid crystal panel 18R through the reflective mirror 16 and the field lens 17R. The liquid crystal panel 18R is an image display element. The liquid crystal panel 18R modulates the light R in accordance with an image signal to form a red image.

Further, the image light generation optical system 2 includes a second dichroic mirror 21, a field lens 17G, and the liquid crystal panel 18G. The second dichroic mirror 21 reflects light G which is green light and a portion of a light beam received from the first dichroic mirror 15, and transmits light B which is blue light and a portion of the light beam received from the first dichroic mirror 15. The light G reflected from the second dichroic mirror 21 is incident on the liquid crystal panel 18G through the field lens 17G. The liquid crystal panel 18G is an image display element. The liquid crystal panel 18G modulates the light G in accordance with an image signal to form a green image.

In addition, the image light generation optical system 2 includes a relay lens 22, a reflective mirror 23, a relay lens 24, a reflective mirror 25, a field lens 17B, and the liquid crystal panel 18B. The light B having passed through the second dichroic mirror 21 is incident on the liquid crystal panel 18B through the relay lens 22, the reflective mirror 23, the relay lens 24, the reflective mirror 25, and the field lens 17B. The liquid crystal panel 18B is an image display element. The liquid crystal panel 18B modulates the light B in accordance with an image signal to form a blue image.

The liquid crystal panel 18R, the liquid crystal panel 18G, and the liquid crystal panel 18B surround a cross dichroic prism 19 from three directions. The cross dichroic prism 19 is a prism for photosynthesis and synthesizes the light beams modulated by the respective liquid crystal panels 18R, 18G, and 18B to generate image light.

Here, the cross dichroic prism 19 constitutes a portion of the projection optical system 3. The projection optical system 3 projects the image light (an image formed by the liquid crystal panels 18R, 18G, and 18B) which is generated by the synthesis of the cross dichroic prism 19 on the screen S in an enlarged manner.

The control unit 4 includes an image processing unit 6 that receives an input of an external image signal such as a video signal, and a display driving unit 7 that drives the liquid crystal panel 18R, the liquid crystal panel 18G, and the liquid crystal panel 18B on the basis of the image signal output from the image processing unit 6.

The image processing unit 6 converts an image signal input from an external apparatus into an image signal including the gradation of each color, and the like. The display driving unit 7 operates the liquid crystal panel 18R, the liquid crystal panel 18G, and the liquid crystal panel 18B on the basis of the image signals of the respective colors output from the image processing unit 6. Thereby, the image processing unit 6 displays an image corresponding to the image signals on the liquid crystal panel 18R, the liquid crystal panel 18G, and the liquid crystal panel 18B.

Projection Optical System

Next, the projection optical system 3 will be described. Hereinafter, Examples 1 to 3 will be described as a configuration example of the projection optical system 3 mounted on the projector 1.

Example 1

Figure 2:
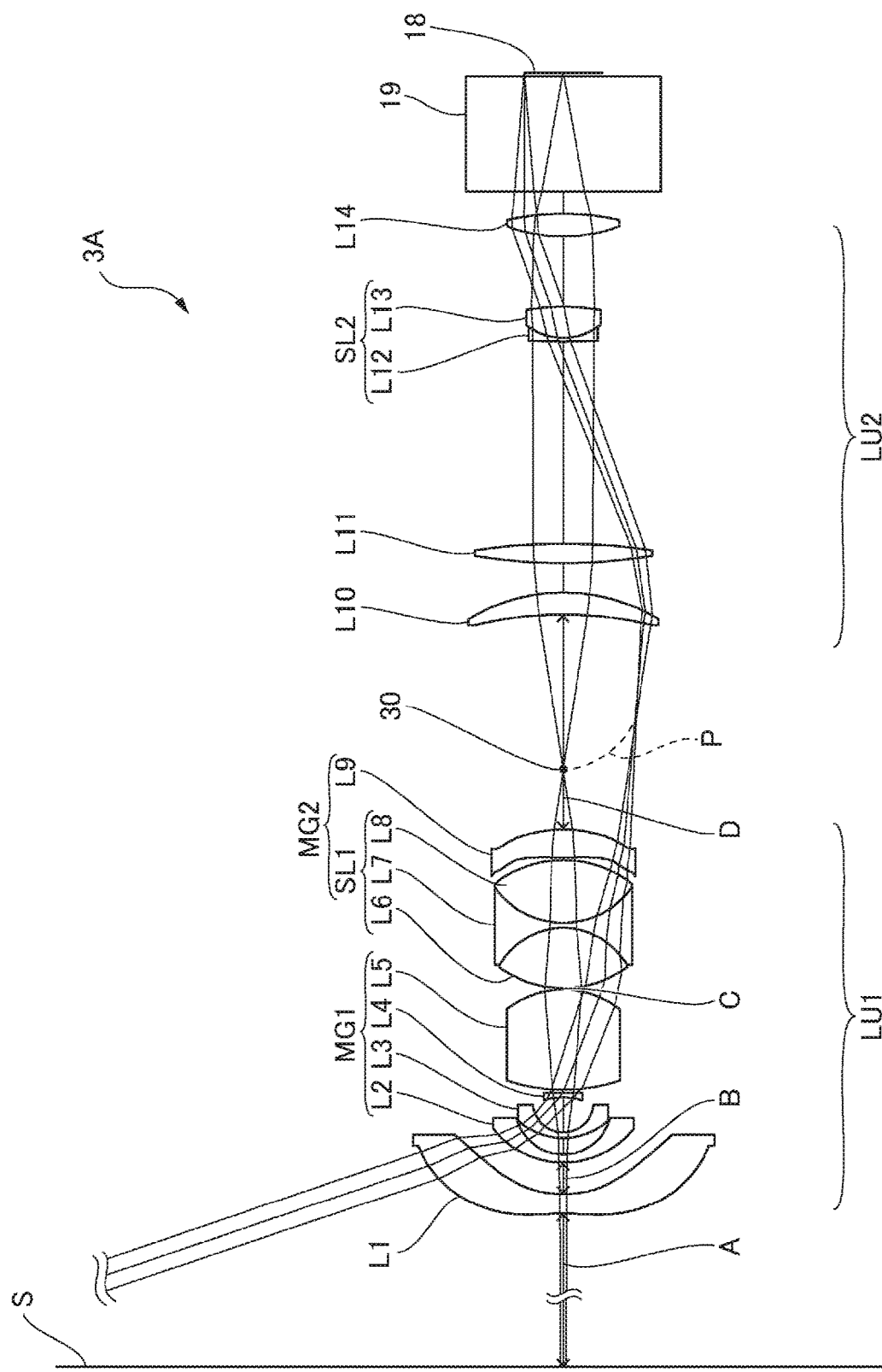
FIG. 2 is a configuration diagram of a projection optical system according to Example 1.

FIG. 2 is a configuration diagram (light beam diagram) of a projection optical system according to Example 1. FIG. 3 is a diagram illustrating lens data of the projection optical system according to Example 1. FIG. 4 is a diagram illustrating aspherical data of an aspherical lens of the projection optical system according to Example 1. As illustrated in FIG. 2, a projection optical system 3A in the present example includes a first lens unit LU1 that conjugates the screen S which is an enlargement-side image forming surface and an intermediate image 30, and a second lens unit LU2 that conjugates the intermediate image 30 and the liquid crystal panels 18 (18R, 18G, 18B) which are reduction-side image forming surfaces. The projection optical system 3A includes fourteen lens elements.

The first lens unit LU1 includes nine lens elements. That is, the first lens unit LU1 includes a first lens unit first lens L1, a first lens unit second lens L2, a first lens unit third lens L3, a first lens unit fourth lens L4, a first lens unit fifth lens L5, a first lens unit sixth lens L6, a first lens unit seventh lens L7, a first lens unit eighth lens L8, and a first lens unit ninth lens L9 toward the intermediate image 30 side from the screen S side.

The first lens unit first lens L1 is an aspherical lens having an aspherical shape on both surfaces on the screen S side and the intermediate image 30 side. In addition, the first lens unit first lens L1 is a negative lens having negative power. Further, the first lens unit first lens L1 is made of a resin. The first lens unit second lens L2 and the first lens unit third lens L3 are negative lenses. The first lens unit fourth lens L4 (minimum effective diameter lens) has the smallest lens effective diameter among the lens elements constituting the first lens unit LU1. The first lens unit fourth lens L4 is a negative lens, and has a concave surface on the screen S side. The first lens unit fifth lens L5 is a positive lens having positive power, and both surfaces on the screen S side and the intermediate image 30 side of the first lens unit fifth lens are convex.

The first lens unit sixth lens L6, the first lens unit seventh lens L7, and the first lens unit eighth lens L8 are bonded to each other to constitute a first lens unit cemented lens SL1. The first lens unit sixth lens L6 is a positive lens (first positive lens), the first lens unit seventh lens L7 is a negative lens, and the first lens unit eighth lens L8 is a positive lens (second positive lens). The first lens unit ninth lens L9 is an aspherical lens having an aspherical shape on both surfaces on the screen S side and the intermediate image 30 side. The first lens unit ninth lens L9 is made of a resin. The first lens unit ninth lens L9 is a positive lens.

The second lens unit LU2 includes five lens elements. That is, the second lens unit LU2 includes a second lens unit first lens L10 (intermediate image-side lens), a second lens unit second lens L11, a second lens unit third lens L12, a second lens unit fourth lens L13, and a second lens unit fifth lens L14 (reduction-side image forming surface-side lens) toward the liquid crystal panel 18 side from the intermediate image 30 side. The cross dichroic prism 19 is disposed between the second lens unit fifth lens L14 and the liquid crystal panel 18.

The second lens unit first lens L10 is a positive lens. The second lens unit third lens L12 and the second lens unit fourth lens L13 are bonded to constitute the second lens unit cemented lens SL2. The second lens unit fifth lens L14 is a positive lens.

As illustrated in FIG. 2, in the projection optical system 3A, a principal ray of an off-axis light beam passing between the first lens unit LU1 and the second lens unit LU2 which are positioned on both sides interposing the intermediate image 30 therebetween approaches an optical axis toward the first lens unit LU1 side from the second lens unit LU2 side. A focusing position P of the off-axis light in the intermediate image 30 approaches the second lens unit LU2 outward the axis.

Here, in a case where the size of projection onto the screen S is changed by the projection optical system 3A, focusing for bringing the screen S into focus is performed by relatively moving a first moving lens group MG1 positioned next to the intermediate image 30 side of the first lens unit first lens L1 and a second moving lens group MG2 positioned next to the intermediate image 30 side of the first moving lens group MG1 in a direction of an optical axis L in a state where the first lens unit first lens L1 is fixed.

The first moving lens group MG1 includes the first lens unit second lens L2, the first lens unit third lens L3, the first lens unit fourth lens L4, and the first lens unit fifth lens L5. The first moving lens group MG1 includes two negative lenses from the first lens unit first lens L1 side. That is, the first lens unit second lens L2 and the first lens unit third lens L3 are negative lenses.

The second moving lens group MG2 includes the first lens unit cemented lens SL1 and the first lens unit ninth lens L9. The second moving lens group MG2 includes at least one positive lens. In the present example, the first lens unit sixth lens L6, the first lens unit eighth lens L8, and the first lens unit ninth lens L9 are positive lenses.

Here, when a focal length is set to be |f|, a maximum angle of view (half angle of view) is set to be ω, an F number is set to be FNo, and an effective image circle diameter is set to be φ, data of the projection optical system 3A is as follows.

|f|=2.85

ω=71.3°

FNo=1.9

φ=17 mm

In addition, lens data of the projection optical system 3A is as illustrated in FIG. 3. In FIG. 3, the column of a lens number is a sign attached to each lens in FIG. 2. A surface having a surface number with * is an aspherical surface. R denotes a radius of curvature. In addition, d denotes an axial surface distance (mm) (a lens thickness or a lens distance). Further, nd denotes a refractive index. In addition, vd denotes an Abbe number. An axial surface distance A is a distance between the screen S and the first lens unit first lens L1. An axial surface distance B is a distance between the first lens unit first lens L1 and the first moving lens group MG1. An axial surface distance C is a distance between the first moving lens group MG1 and the second moving lens group MG2. An axial surface distance D is a distance between the second moving lens group MG2 and the second lens unit LU2. The axial surface distance A changes depending on the size of projection, and the axial surface distances B, C, and D change due to focusing in a case where the size of projection is changed.

The axial surface distances A, B, C, and D in a case where focusing is performed by changing the size of projection are as follows. Meanwhile, the position of each lens element after focusing when the axial surface distance A which is a distance between the first lens unit first lens L1 and the screen S is set to 500 mm is set to be a position 1, the position of each lens element when the axial surface distance A is set to 400 mm is set to be a position 2, and the position of each lens element when the axial surface distance A is set to 700 mm is set to be a position 3.

|   | Position 1 | Position 2 | Position 3 |
|---|---|---|---|
| A | 500 | 400 | 700 |
| B | 6.889 | 7.018 | 6.756 |
| C | 0.341 | 0.2 | 0.487 |
| D | 46.845 | 46.857 | 46.832 |

Next, pieces of aspherical data of aspherical surfaces (surface numbers 1 and 2) of the first lens unit first lens L1 and aspherical surfaces (surface numbers 15 and 16) of the first lens unit ninth lens L9 are as illustrated in FIG. 4. In FIG. 4, in the aspherical surfaces (surface numbers 1 and 2) of the first lens unit first lens L1, coefficients of an odd-order aspherical surface type for specifying an aspherical shape are shown. In the aspherical surfaces (surface numbers 15 and 16) of the first lens unit ninth lens L9, coefficients of an even-order aspherical surface type for specifying an aspherical shape are shown.

Here, the projection optical system 3A in the present example satisfies the following Conditional Expression (1) and Conditional Expression (2) when the number of lens elements of the first lens unit LU1 and the number of lens elements of the second lens unit LU2 are set to be Num1 and Num2, respectively.

$$\text{Num2} \leq 7 \tag{1}$$

$$1.5 \leq \text{Num1}/\text{Num2} \leq 2.5 \tag{2}$$

That is, relations of Num1=9, Num2=5, and 1.5≤(Num1/Num2=1.8)≤2.5 are established.

The projection optical system 3A satisfies Conditional Expression (1), and thus an upper limit of the number of lens elements of the second lens unit LU2 is specified. Therefore, the number of lens elements of the second lens unit LU2 is easily suppressed. In addition, Conditional Expression (1) and Conditional Expression (2) are satisfied, and thus an upper limit of the number of lens elements of the whole lens system of the projection optical system 3A is specified. Accordingly, it is easy to suppress the number of lens elements and the total length of the whole lens system. In the present example, the number of lens elements of the whole lens system of the projection optical system 3A is 14. In addition, Conditional Expression (2) is satisfied, and thus the number of elements of the first lens unit LU1 becomes larger than that of the second lens unit LU2. Therefore, it becomes easy to correct curvature of field and distortion aberration, occurring on the second lens unit LU2 side, on the first lens unit LU1 side by suppressing the number of lens elements of the second lens unit LU2.

In addition, the first lens unit LU1 includes at least two aspherical lenses. In the present example, the first lens unit first lens L1 and the first lens unit ninth lens L9 are aspherical lenses. Thereby, it is easy to correct aberration, occurring on the second lens unit LU2 side, on the first lens unit LU1 side. In addition, the first lens unit first lens L1 which is an aspherical lens is disposed on the first lens unit LU1 side closest to the screen S side, and thus it is possible to satisfactorily correct the distortion aberration. Further, the first lens unit ninth lens L9 which is an aspherical lens is disposed on the first lens unit LU1 side closest to the intermediate image 30 side, and thus it is possible to satisfactorily correct the curvature of field. In addition, two aspherical lenses are made of a resin (plastic lens), and thus it is possible to suppress the manufacturing cost of the projection optical system 3A as compared with a case where a glass lens is used.

Further, in the present example, the first lens unit cemented lens SL1 formed by bonding three lenses (the first lens unit sixth lens L6, the first lens unit seventh lens L7, and the first lens unit eighth lens L8) to each other is provided. In addition, the first lens unit cemented lens SL1 satisfies all of the following Conditional Expression (3) to Conditional Expression (6) when a refractive index and an Abbe number of the first lens unit sixth lens L6 are respectively set to be n1 and vd1, a refractive index and an Abbe number of the first lens unit seventh lens L7 are respectively set to be n2 and vd2, and a refractive index and an Abbe number of the first lens unit eighth lens L8 are respectively set to be n3 and vd3.

$$n2 - n1 > 0.15 \tag{3}$$

$$n2 - n3 > 0.2 \tag{4}$$

$$vd1 - vd2 > 30 \tag{5}$$

$$vd3 - vd2 > 30 \tag{6}$$

That is, the values of Conditional Expression (3) to Conditional Expression (6) are as follows.

$$n2 - n1 = (1.85478 - 1.61801) = 0.23677 > 00.2$$

$$n2 - n3 = (1.85478 - 1.61801) = 0.23677 > 00.2$$

$$vd1 - vd2 = (63.33 - 24.8) = 38.53 > 30$$

$$vd3 - vd2(63.33 - 24.8) = 38.53 > 30$$

When the refractive indexes and the Abbe numbers of the three lenses constituting the first lens unit cemented lens SL1 satisfy Conditional Expression (3) to Conditional Expression (6), it is possible to satisfactorily correct magnification chromatic aberration. In addition, the projection optical system 3A includes the first lens unit cemented lens SL1 formed by bonding the three lenses to each other, and thus it is possible to prevent eccentricity and collapse of each lens element as compared with a case where the three lenses are disposed individually. Thereby, it is possible to suppress eccentric occurrence of blur and flare.

Further, in the present example, the first lens unit fourth lens L4 having the smallest lens effective diameter among the lens elements constituting the first lens unit LU1 is a negative lens having a concave surface on the screen S side. When the focal length of the first lens unit LU1 is set to be f1U and the focal length of the first lens unit fourth lens L4 is set to be f2, the following Conditional Expression (7) is satisfied.

$$-50 < f2/f1U < -5 \tag{7}$$

That is, the value of Conditional Expression (7) is as follows.

$$-50 < f2/f1U = (-35.90/4.90) = -7.327 < -5$$

When the first lens unit fourth lens L4 which is a minimum effective diameter lens of the first lens unit LU1 is set to be a negative lens having a concave surface on the screen S side, it becomes easy to take in a required amount of light while suppressing the increase of the total length of the second lens unit LU2 and a lens diameter of each lens element constituting the second lens unit LU2. In addition, when Conditional Expression (7) is satisfied, it becomes easy to suppress performance deterioration during focusing while suppressing the increase of the lens diameter of the first lens unit fourth lens L4 which is a minimum effective diameter lens. That is, when Conditional Expression (7) exceeds a lower limit, it is necessary to increase the lens diameter of the first lens unit fourth lens L4 which is a minimum effective diameter lens in order to take in a required amount of light. In addition, when Conditional Expression (7) exceeds the lower limit, a fluctuation in astigmatism tends to be increased during focusing. When Conditional Expression (7) exceeds an upper limit, it becomes difficult to correct the surrounding coma aberration.

Further, in the present example, a principal ray of an off-axis light beam between the second lens unit LU2 and the first lens unit LU1 approaches the optical axis L toward the first lens unit LU1 side from the second lens unit LU2 side. Thereby, it is easy to correct distortion aberration, occurring on the first lens unit LU1 side, on the second lens unit LU2 side. In addition, a focusing position of off-axis light in the intermediate image 30 approaches the second lens unit LU2 outward the axis. Thereby, it becomes easier to correct the distortion aberration, occurring on the first lens unit LU1 side, on the second lens unit LU2 side.

Further, in the present example, the second lens unit first lens L10 positioned closest to the intermediate image 30 side and the second lens unit fifth lens L14 positioned closest to the liquid crystal panel side, among the lens elements of the second lens unit LU2, are positive lenses. When a refractive index of d-line of the second lens unit first lens L10 is set to be nc1, a refractive index of d-line of the second lens unit fifth lens L14 is set to be nc2, and a partial dispersion ratio of the second lens unit fifth lens L14 is set to be θg,F, the following Conditional Expression (8) to Conditional Expression (10) are satisfied.

$$nc1>1.8 \quad (8)$$

$$nc2>1.8 \quad (9)$$

$$\theta g,F>0.58 \quad (10)$$

That is, the values of Conditional Expression (8) to Conditional Expression (10) are as follows.

$$nc1=1.8061>1.8$$

$$nc2=1.8061>1.8$$

$$\theta g,F=0.5883>0.58$$

Since Conditional Expression (8) and Conditional Expression (9) are satisfied, a refractive index is set to be relatively high in the second lens unit first lens L10 and the second lens unit fifth lens L14. Therefore, even when the number of lens elements of the second lens unit LU2 is reduced, it is easy to form the intermediate image 30. Here, in a case where the refractive indexes of the second lens unit first lens L10 and the second lens unit fifth lens L14 are increased, chromatic aberration tends to occur in the second lens unit LU2. On the other hand, when the partial dispersion ratio of the second lens unit fifth lens L14 satisfies Conditional Expression (10), it is possible to suppress the occurrence of magnification chromatic aberration and axial chromatic aberration in the second lens unit LU2.

Further, in the present example, when an absolute value of a focal length of d-line of the whole lens system of the projection optical system 3A is set to be |f| and a back focus air-converted value is set to be BF, the following Conditional Expression (11) is satisfied.

$$BF/|f|>6 \quad (11)$$

That is, the value of Conditional Expression (7) is as follows.

$$BF/|f|=(22.25/|2.85|)=7.8>6$$

Since Conditional Expression (7) is satisfied, the projection optical system 3A is a wide-angle lens system having a half angle of view of 60 degrees or greater and a long back focus.

Figure 5:
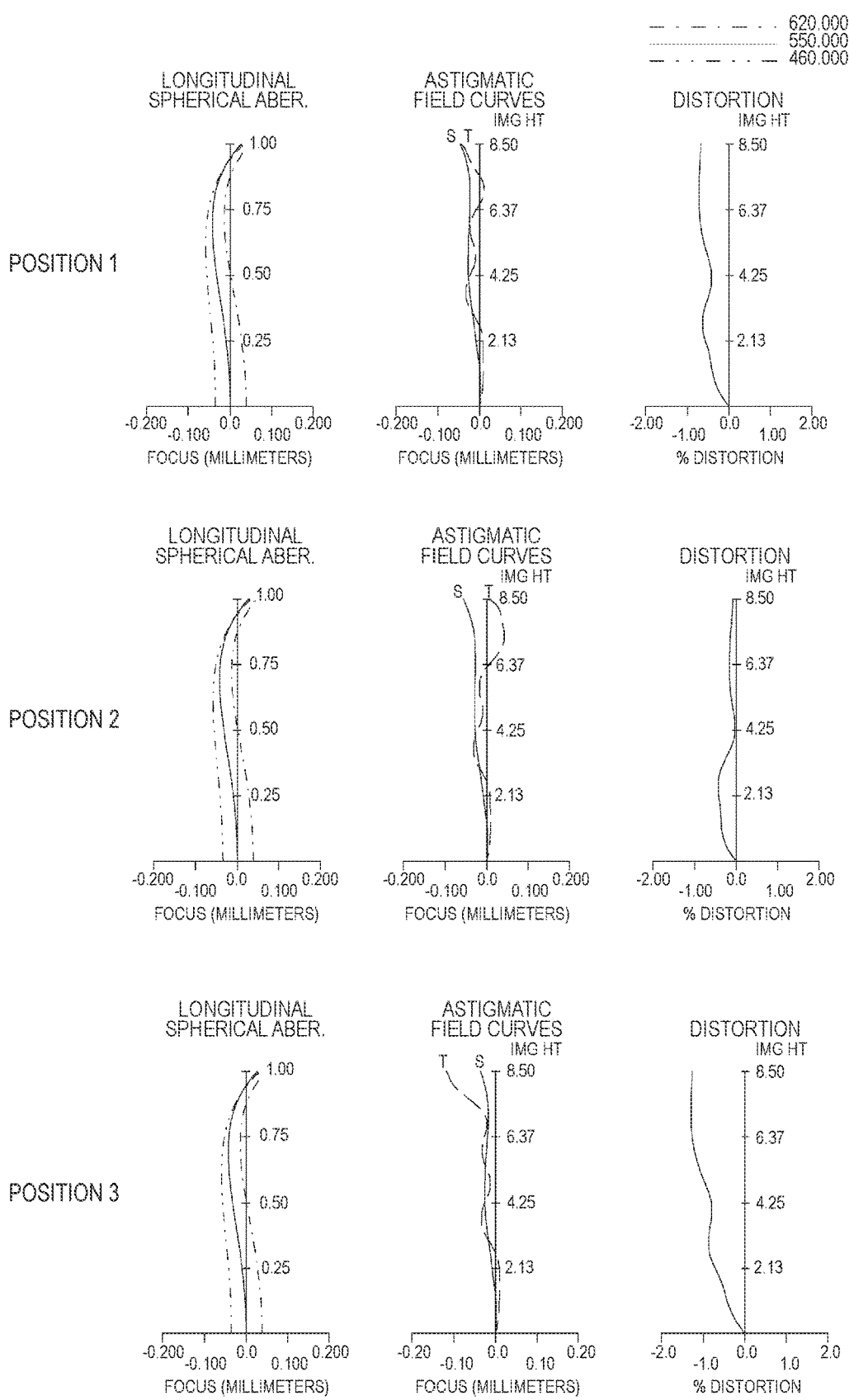
FIG. 5 is a diagram illustrating aberration of the projection optical system according to Example 1.

The upper figure in FIG. 5 is an aberration diagram (spherical aberration, astigmatism, and distortion aberration) in a case where the lens elements of the projection optical system 3A are at the position 1, the middle figure in FIG. 5 is an aberration diagram (spherical aberration, astigmatism, and distortion aberration) in a case where the lens elements of the projection optical system 3A are at the position 2, and the lower figure in FIG. 5 is an aberration diagram (spherical aberration, astigmatism, and distortion aberration) in a case where the lens elements of the projection optical system 3A are at the position 3. As illustrated in FIG. 5, in the projection optical system 3A, spherical aberration, astigmatism, and distortion aberration are satisfactorily corrected.

Meanwhile, in the above-described example, lenses having an aspherical surface in the first lens unit LU1 are two lenses of the first lens unit first lens L1 and the first lens unit ninth lens L9, but other lenses may have an aspherical surface in the first lens unit LU1, in addition to these two lenses.

In addition, when the projection optical system 3A is incorporated into the projector 1, it is possible to dispose a mirror between the lens elements and bend a light path (optical axis L) therebetween.

Example 2

Figure 6:
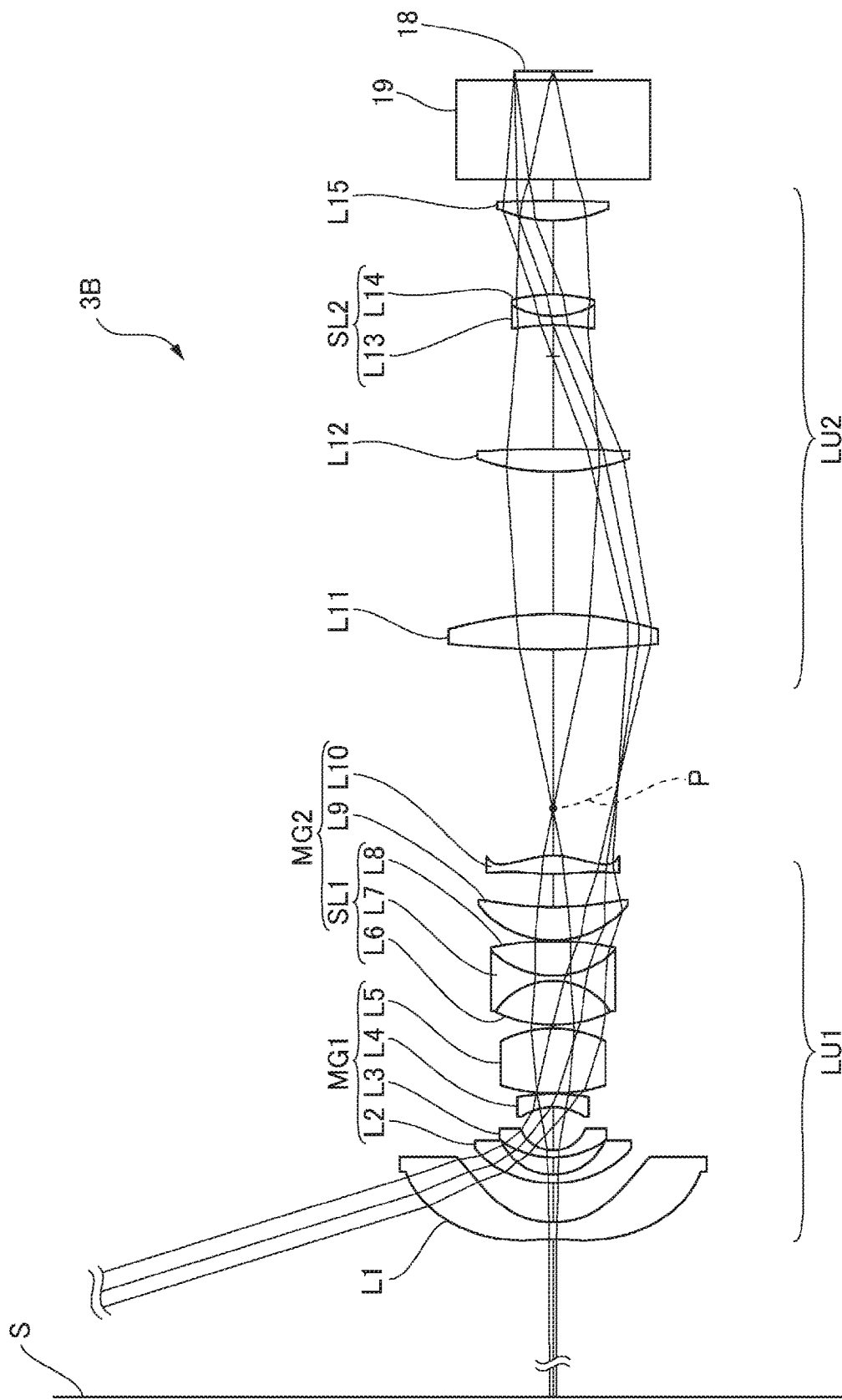
FIG. 6 is a configuration diagram of a projection optical system according to Example 2.

FIG. 6 is a configuration diagram (light beam diagram) of a projection optical system according to Example 2. FIG. 7 is a diagram illustrating lens data of the projection optical system according to Example 2. FIG. 8 is a diagram illustrating aspherical data of an aspherical lens of the projection optical system according to Example 2. As illustrated in FIG. 6, a projection optical system 3B in the present example includes a first lens unit LU1 that conjugates a screen S which is an enlargement-side image forming surface and an intermediate image 30, and a second lens unit LU2 that conjugates the intermediate image 30 and liquid crystal panels (18R, 18G, 18B) which are reduction-side image forming surfaces. The projection optical system. 3B includes fourteen lens elements.

The first lens unit LU1 includes ten lens elements. That is, the first lens unit LU1 includes a first lens unit first lens L1, a first lens unit second lens L2, a first lens unit third lens L3, a first lens unit fourth lens L4, a first lens unit fifth lens L5, a first lens unit sixth lens L6, a first lens unit seventh lens L7, a first lens unit eighth lens L8, a first lens unit ninth lens L9, and a first lens unit tenth lens L10 toward the intermediate image 30 side from the screen S side.

The first lens unit first lens L1 is an aspherical lens having an aspherical shape on both surfaces on the screen S side and the intermediate image 30 side. In addition, the first lens unit first lens L1 is a negative lens having negative power. Further, the first lens unit first lens L1 is made of a resin. The first lens unit second lens L2 and the first lens unit third lens L3 are negative lenses. The first lens unit fourth lens L4 (minimum effective diameter lens) has the smallest lens effective diameter among the lens elements constituting the first lens unit LU1. The first lens unit fourth lens L4 is a negative lens, and has a concave surface on the screen S side. The first lens unit fifth lens L5 is a positive lens having positive power, and both surfaces on the screen S side and the intermediate image 30 side of the first lens unit fifth lens are convex.

The first lens unit sixth lens L6, the first lens unit seventh lens L7, and the first lens unit eighth lens L8 are bonded to each other to constitute a first lens unit cemented lens SL1. The first lens unit sixth lens L6 is a positive lens (first positive lens), the first lens unit seventh lens L7 is a negative lens, and the first lens unit eighth lens L8 is a positive lens (second positive lens). The first lens unit ninth lens L9 is a positive lens having a convex surface on the screen S side. The first lens unit tenth lens L10 is an aspherical lens having an aspherical shape on both surfaces on the screen S side and the intermediate image 30 side. The first lens unit tenth lens L10 is made of a resin.

The second lens unit LU2 includes five lens elements. That is, the second lens unit LU2 includes a second lens unit first lens L11 (intermediate image-side lens), a second lens unit second lens L12, a second lens unit third lens L13, a second lens unit fourth lens L14, and a second lens unit fifth lens L15 (reduction-side image forming surface-side lens) toward the liquid crystal panel 18 side from the intermediate image 30 side. A cross dichroic prism 19 is disposed between the second lens unit fifth lens L15 and the liquid crystal panel 18.

The second lens unit first lens L11 is a positive lens. The second lens unit second lens L12 is an aspherical lens having an aspherical shape on both surfaces on the intermediate image 30 side and the liquid crystal panel 18 side. The second lens unit third lens L13 and the second lens unit fourth lens L14 are bonded to each other to constitute the second lens unit cemented lens SL2. The second lens unit fifth lens L15 is a positive lens.

As illustrated in FIG. 6, in the projection optical system 3B, a principal ray of an off-axis light beam passing between the first lens unit LU1 and the second lens unit LU2 which are positioned on both sides interposing the intermediate image 30 therebetween approaches an optical axis toward the first lens unit LU1 side from the second lens unit LU2 side. A focusing position P of the off-axis light in the intermediate image 30 approaches the second lens unit LU2 outward the axis.

Here, in a case where the size of projection onto the screen S is changed by the projection optical system 3B, focusing for bringing the screen S into focus is performed by relatively moving a first moving lens group MG1 positioned next to the intermediate image 30 side of the first lens unit first lens L1 and a second moving lens group MG2 positioned next to the intermediate image 30 side of the first moving lens group MG1 in a direction of an optical axis L in a state where the first lens unit first lens L1 is fixed.

The first moving lens group MG1 includes the first lens unit second lens L2, the first lens unit third lens L3, the first lens unit fourth lens L4, and the first lens unit fifth lens L5. The first moving lens group MG1 includes two negative lenses from the first lens unit first lens L1 side. That is, the first lens unit second lens L2 and the first lens unit third lens L3 are negative lenses.

The second moving lens group MG2 includes the first lens unit cemented lens SL1, the first lens unit ninth lens L9, and the first lens unit tenth lens L10. The second moving lens group MG2 includes at least one positive lens. In the present example, the first lens unit sixth lens L6, the first lens unit eighth lens L8, the first lens unit ninth lens L9, and the first lens unit tenth lens L10 are positive lenses.

Here, when a focal length is set to be |f|, a maximum angle of view (half angle of view) is set to be ω, an F number is set to be FNo, and an effective image circle diameter is set to be φ, data of the projection optical system 3B is as follows.

|f|=2.8

ω=71.9°

FNo=1.7

φ=17 mm

In addition, lens data of the projection optical system 3B is as illustrated in FIG. 7. In FIG. 7, the column of a lens number is a sign attached to each lens in FIG. 6. A surface having a surface number with * is an aspherical surface. R denotes a radius of curvature. In addition, d denotes an axial surface distance (mm) (a lens thickness or a lens distance). Further, nd denotes a refractive index. In addition, νd denotes an Abbe number. An axial surface distance A is a distance between the screen S and the first lens unit first lens L1. An axial surface distance B is a distance between the first lens unit first lens L1 and the first moving lens group MG1. An axial surface distance C is a distance between the first moving lens group MG1 and the second moving lens group MG2. An axial surface distance D is a distance between the second moving lens group MG2 and the second lens unit LU2. The axial surface distance A changes depending on the size of projection, and the axial surface distances B, C, and D change due to focusing in a case where the size of projection is changed.

The axial surface distances A, B, C, and D in a case where focusing is performed by changing the size of projection are as follows. Meanwhile, the position of each lens element after focusing when the axial surface distance A which is a distance between the first lens unit first lens L1 and the screen S is set to 500 mm is set to be a position 1, the position of each lens element when the axial surface distance A is set to 400 mm is set to be a position 2, and the position of each lens element when the axial surface distance A is set to 700 mm is set to be a position 3.

|   | Position 1 | Position 2 | Position 3 |
|---|---|---|---|
| A | 500 | 400 | 700 |
| B | 9.029 | 9.066 | 8.964 |
| C | 0.855 | 0.8 | 0.93 |
| D | 47.627 | 47.645 | 47.617 |

Next, pieces of aspherical data of aspherical surfaces (surface numbers 1 and 2) of the first lens unit first lens L1 and aspherical surfaces (surface numbers 15 and 16) of the first lens unit tenth lens L10 are as illustrated in FIG. 8. In FIG. 8, in the aspherical surfaces (surface numbers 1 and 2) of the first lens unit first lens L1, coefficients of an odd-order aspherical surface type for specifying an aspherical shape are shown. In aspherical surfaces (surface numbers 17 and 18) of the first lens unit tenth lens L10 and aspherical surfaces (surface numbers 21 and 22) of the second lens unit second lens L12, coefficients of an even-order aspherical surface type for specifying an aspherical shape are shown.

Here, the projection optical system 3B in the present example satisfies the following Conditional Expression (1) and Conditional Expression (2) when the number of lens elements of the first lens unit LU1 and the number of lens elements of the second lens unit LU2 are set to be Num1 and Num2, respectively.

$$\text{Num2} \leq 7 \tag{1}$$

$$1.5 \leq \text{Num1/Num2} \leq 2.5 \tag{2}$$

That is, relations of Num1=10, Num2=5, and 1.5≤(Num1/Num2=2)≤2.5 are established.

The projection optical system 3B satisfies Conditional Expression (1), and thus an upper limit of the number of lens elements of the second lens unit LU2 is specified. Therefore, the number of lens elements of the second lens unit LU2 is easily suppressed. In addition, Conditional Expression (1) and Conditional Expression (2) are satisfied, and thus an upper limit of the number of lens elements of the whole lens system of the projection optical system 3B is specified. Accordingly, it is easy to suppress the number of lens elements and the total length of the whole lens system. In the present example, the number of lens elements of the whole lens system of the projection optical system 3B is 14. In addition, Conditional Expression (2) is satisfied, and thus the number of elements of the first lens unit LU1 becomes larger than that of the second lens unit LU2. Therefore, it becomes easy to correct curvature of field and distortion aberration, occurring on the second lens unit LU2 side, on the first lens unit LU1 side by suppressing the number of lens elements of the second lens unit LU2.

In addition, the first lens unit LU1 includes at least two aspherical lenses. In the present example, the first lens unit first lens L1 and the first lens unit tenth lens L10 are aspherical lenses. Thereby, it is easy to correct aberration, occurring on the second lens unit LU2 side, on the first lens unit LU1 side. In addition, the first lens unit first lens L1 which is an aspherical lens is disposed on the first lens unit LU1 side closest to the screen S side, and thus it is possible to satisfactorily correct the distortion aberration. Further, the first lens unit tenth lens L10 which is an aspherical lens is disposed on the first lens unit LU1 side closest to the intermediate image 30 side, and thus it is possible to satisfactorily correct the curvature of field. In addition, two aspherical lenses are made of a resin (plastic lens), and thus it is possible to suppress the manufacturing cost of the projection optical system 3B as compared with a case where a glass lens is used.

Further, in the present example, the first lens unit cemented lens SL1 formed by bonding three lenses (the first lens unit sixth lens L6, the first lens unit seventh lens L7, and the first lens unit eighth lens L8) to each other is provided. In addition, the first lens unit cemented lens SL1 satisfies all of the following Conditional Expression (3) to Conditional Expression (6) when a refractive index and an Abbe number of the first lens unit sixth lens L6 are respectively set to be n1 and vd1, a refractive index and an Abbe number of the first lens unit seventh lens L7 are respectively set to be n2 and vd2, and a refractive index and an Abbe number of the first lens unit eighth lens L8 are respectively set to be n3 and vd3.

$$n2-n1>0.15 \quad (3)$$

$$n2-n3>0.2 \quad (4)$$

$$vd1-vd2>30 \quad (5)$$

$$vd3-vd2>30 \quad (6)$$

That is, the values of Conditional Expression (3) to Conditional Expression (6) are as follows.

$$n2-n1=(1.80518-1.623)=0.18218>0.15$$

$$n2-n3=(1.80518-1.49701)=0.30817>00.2$$

$$vd1-vd2=(58.17-25.43)=32.74>30$$

$$vd3-vd2(81.55-25.43)=56.12>30$$

When the refractive indexes and the Abbe numbers of the three lenses constituting the first lens unit cemented lens SL1 satisfy Conditional Expression (3) to Conditional Expression (6), it is possible to satisfactorily correct magnification chromatic aberration. In addition, the projection optical system 3B includes the first lens unit cemented lens SL1 formed by bonding the three lenses to each other, and thus it is possible to prevent eccentricity and collapse of each lens element as compared with a case where the three lenses are disposed individually. Thereby, it is possible to suppress eccentric occurrence of blur and flare.

Further, in the present example, the first lens unit fourth lens L4 having the smallest lens effective diameter among the lens elements constituting the first lens unit LU1 is a negative lens having a concave surface on the screen S side. When the focal length of the first lens unit LU1 is set to be f1U and the focal length of the first lens unit fourth lens L4 is set to be f2, the following Conditional Expression (7) is satisfied.

$$-50<f2/f1U<-5 \quad (7)$$

That is, the value of Conditional Expression (7) is as follows.

$$-50<f2/f1U=(-33.5/4.4)=-7.614<-5$$

When the first lens unit fourth lens L4 which is a minimum effective diameter lens of the first lens unit LU1 is set to be a negative lens having a concave surface on the screen S side, it becomes easy to take in a required amount of light while suppressing the increase of the total length of the second lens unit LU2 and a lens diameter of each lens element constituting the second lens unit LU2. In addition, when Conditional Expression (7) is satisfied, it becomes easy to suppress performance deterioration during focusing while suppressing the increase of the lens diameter of the first lens unit fourth lens L4 which is a minimum effective diameter lens. That is, when Conditional Expression (7) exceeds a lower limit, it is necessary to increase the lens diameter of the first lens unit fourth lens L4 which is a minimum effective diameter lens in order to take in a required amount of light. In addition, when Conditional Expression (7) exceeds the lower limit, a fluctuation in astigmatism tends to be increased during focusing. When Conditional Expression (7) exceeds an upper limit, it becomes difficult to correct the surrounding coma aberration.

Further, in the present example, a principal ray of an off-axis light beam between the second lens unit LU2 and the first lens unit LU1 approaches the optical axis L toward the first lens unit LU1 side from the second lens unit LU2 side. Thereby, it is easy to correct distortion aberration, occurring on the first lens unit LU1 side, on the second lens unit LU2 side. In addition, a focusing position of off-axis light in the intermediate image 30 approaches the second lens unit LU2 outward the axis. Thereby, it becomes easier to correct the distortion aberration, occurring on the first lens unit LU1 side, on the second lens unit LU2 side.

Further, in the present example, the second lens unit first lens L11 positioned closest to the intermediate image 30 side and the second lens unit fifth lens L15 positioned closest to the liquid crystal panel side, among the lens elements of the second lens unit LU2, are positive lenses. When a refractive index of d-line of the second lens unit first lens L11 is set to be nc1, a refractive index of d-line of the second lens unit fifth lens L15 is set to be nc2, and a partial dispersion ratio of the second lens unit fifth lens L15 is set to be θg,F, the following Conditional Expression (8) to Conditional Expression (10) are satisfied.

$$nc1>1.8 \quad (8)$$

$$nc2>1.8 \quad (9)$$

$$\theta g,F>0.58 \quad (10)$$

That is, the values of Conditional Expression (8) to Conditional Expression (10) are as follows.

$$nc1=1.92286>1.8$$

$$nc2=1.92286>1.8$$

$$\theta g,F=0.6388>0.58$$

Since Conditional Expression (8) and Conditional Expression (9) are satisfied, a refractive index is set to be relatively high in the second lens unit first lens L11 and the second lens unit fifth lens L15. Therefore, even when the number of lens elements of the second lens unit LU2 is reduced, it is easy to form the intermediate image 30. Here, in a case where the refractive indexes of the second lens unit first lens L11 and the second lens unit fifth lens L15 are increased, chromatic aberration tends to occur in the second lens unit LU2. On the other hand, when the partial dispersion ratio of the second lens unit fifth lens L15 satisfies Conditional Expression (10), it is possible to suppress the occurrence of magnification chromatic aberration and axial chromatic aberration in the second lens unit LU2.

Further, in the present example, when an absolute value of a focal length of d-line of the whole lens system of the projection optical system 3B is set to be |f| and a back focus air-converted value is set to be BF, the following Conditional Expression (11) is satisfied.

$$BF/|f|>6 \qquad (11)$$

That is, the value of Conditional Expression (7) is as follows.

$$BF/|f|=(22.24/|2.8|)=7.9>6$$

Since Conditional Expression (7) is satisfied, the projection optical system 3B is a wide-angle lens system having a half angle of view of 60 degrees or greater and a long back focus.

Figure 9:
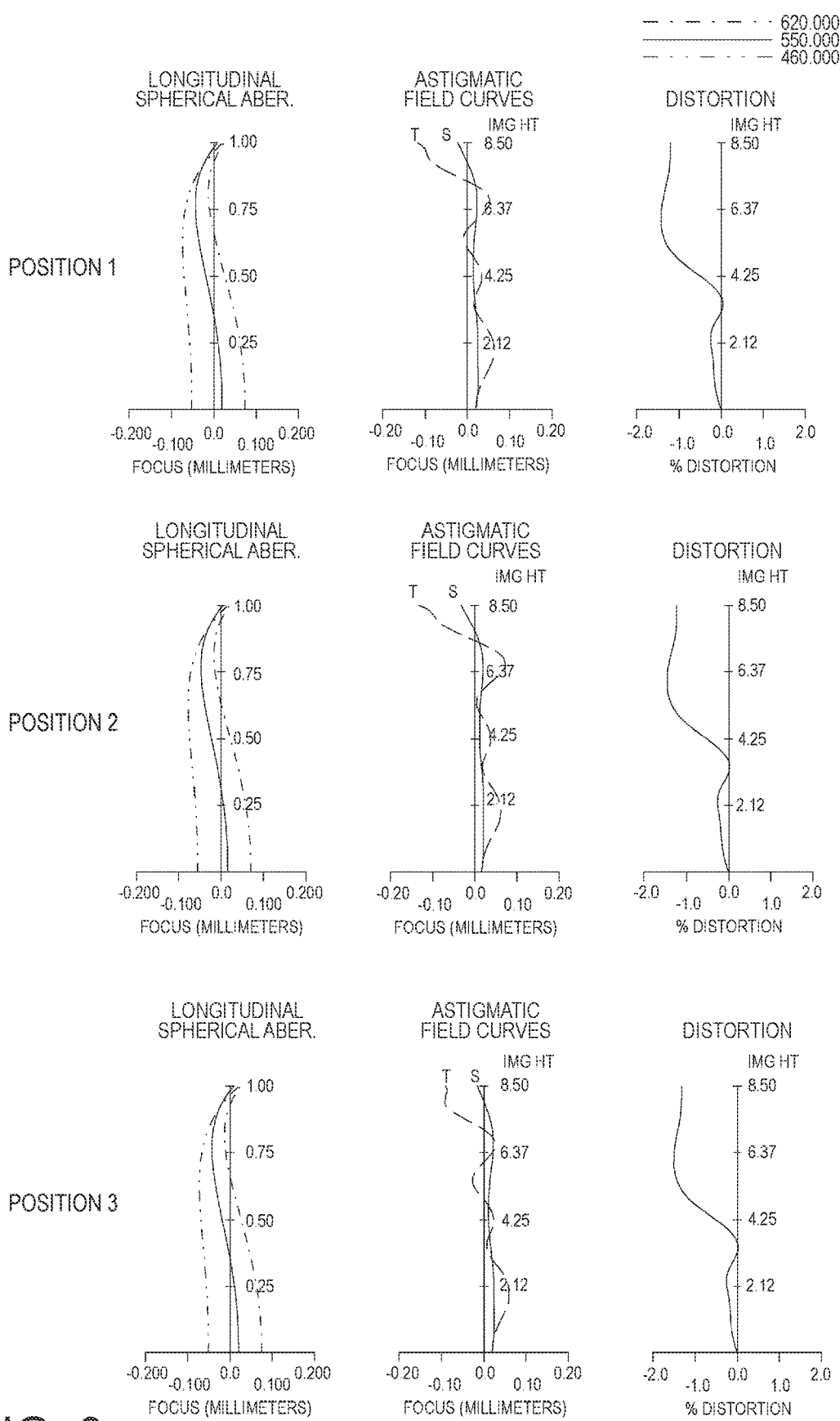
FIG. 9 is a diagram illustrating aberration of the projection optical system according to Example 2.

The upper figure in FIG. 9 is an aberration diagram (spherical aberration, astigmatism, and distortion aberration) in a case where the lens elements of the projection optical system 3B are at the position 1, the middle figure in FIG. 9 is an aberration diagram (spherical aberration, astigmatism, and distortion aberration) in a case where the lens elements of the projection optical system 3B are at the position 2, and the lower figure in FIG. 9 is an aberration diagram (spherical aberration, astigmatism, and distortion aberration) in a case where the lens elements of the projection optical system 3B are at the position 3. As illustrated in FIG. 9, in the projection optical system 3B, spherical aberration, astigmatism, and distortion aberration are satisfactorily corrected.

Meanwhile, in the above-described example, lenses having an aspherical surface in the first lens unit LU1 are two lenses of the first lens unit first lens L1 and the first lens unit tenth lens L10, but other lenses may have an aspherical surface in the first lens unit LU1, in addition to these two lenses.

In addition, when the projection optical system 3B is incorporated into the projector 1, it is possible to dispose a mirror between the lens elements and bend a light path (optical axis L) therebetween.

Example 3

Figure 10:
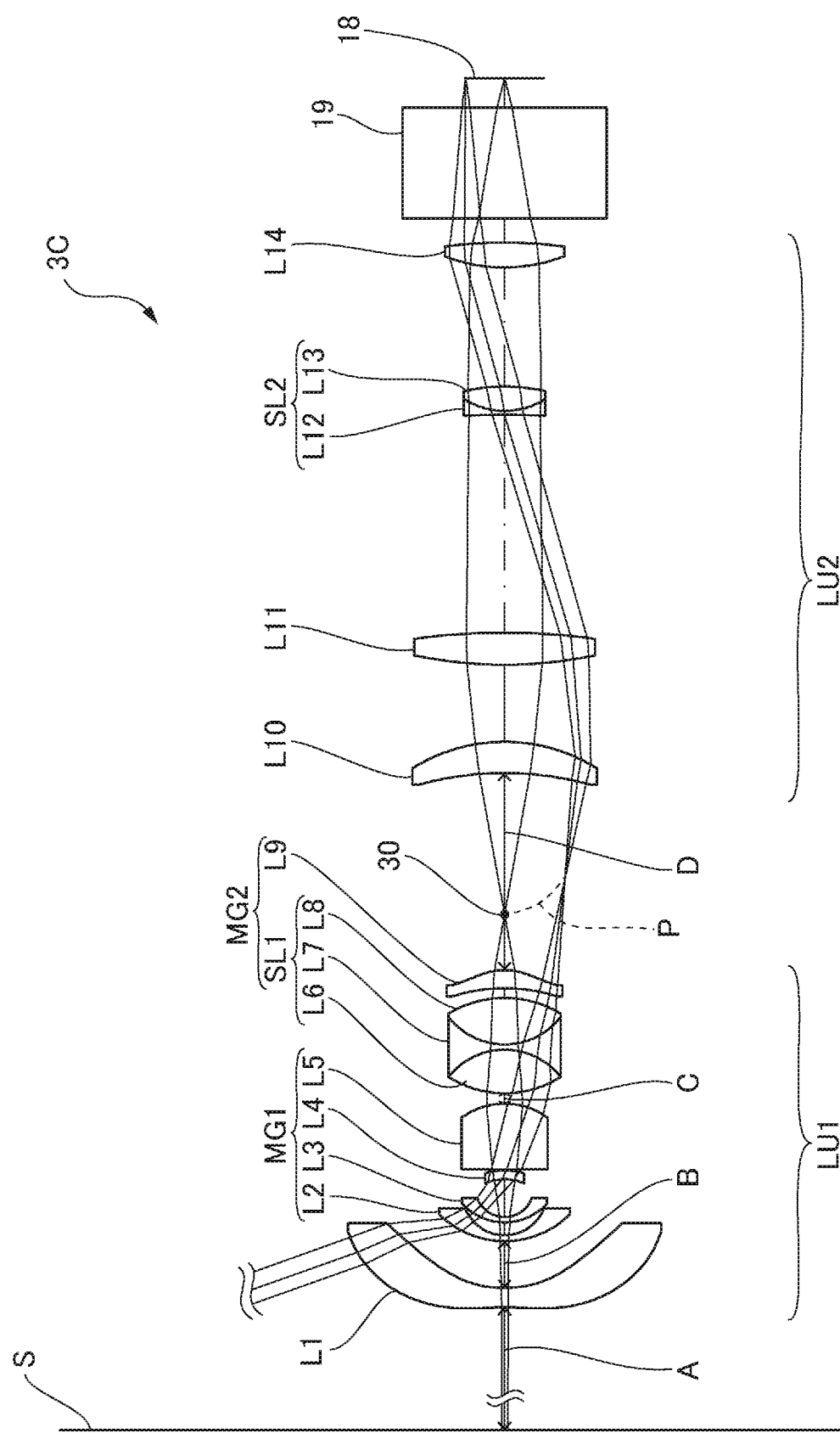
FIG. 10 is a configuration diagram of a projection optical system according to Example 3.

FIG. 10 is a configuration diagram (light beam diagram) of a projection optical system according to Example 3. FIG. 11 is a diagram illustrating lens data of the projection optical system according to Example 3. FIG. 12 is a diagram illustrating aspherical data of an aspherical lens of the projection optical system according to Example 3. As illustrated in FIG. 10, a projection optical system 3C in the present example includes a first lens unit LU1 that conjugates the screen S which is an enlargement-side image forming surface and an intermediate image 30, and a second lens unit LU2 that conjugates the intermediate image 30 and the liquid crystal panels 18 (18R, 18G, 18B) which are reduction-side image forming surfaces. The projection optical system 3C includes fourteen lens elements.

The first lens unit LU1 includes nine lens elements. That is, the first lens unit LU1 includes a first lens unit first lens L1, a first lens unit second lens L2, a first lens unit third lens L3, a first lens unit fourth lens L4, a first lens unit fifth lens L5, a first lens unit sixth lens L6, a first lens unit seventh lens L7, a first lens unit eighth lens L8, and a first lens unit ninth lens L9 toward the intermediate image 30 side from the screen S side.

The first lens unit first lens L1 is an aspherical lens having an aspherical shape on both surfaces on the screen S side and the intermediate image 30 side. In addition, the first lens unit first lens L1 is a negative lens having negative power. Further, the first lens unit first lens L1 is made of a resin. The first lens unit second lens L2 and the first lens unit third lens L3 are negative lenses. The first lens unit fourth lens L4 (minimum effective diameter lens) has the smallest lens effective diameter among the lens elements constituting the first lens unit LU1. The first lens unit fourth lens L4 is a negative lens, and has a concave surface on the screen S side. The first lens unit fifth lens L5 is a positive lens having positive power, and both surfaces on the screen S side and the intermediate image 30 side of the first lens unit fifth lens are convex.

The first lens unit sixth lens L6, the first lens unit seventh lens L7, and the first lens unit eighth lens L8 are bonded to each other to constitute a first lens unit cemented lens SL1. The first lens unit sixth lens L6 is a positive lens (first positive lens), the first lens unit seventh lens L7 is a negative lens, and the first lens unit eighth lens L8 is a positive lens (second positive lens). The first lens unit ninth lens L9 is an aspherical lens having an aspherical shape on both surfaces on the screen S side and the intermediate image 30 side. The first lens unit ninth lens L9 is made of a resin. The first lens unit ninth lens L9 is a positive lens.

The second lens unit LU2 includes five lens elements. That is, the second lens unit LU2 includes a second lens unit first lens L10 (intermediate image-side lens), a second lens unit second lens L11, a second lens unit third lens L12, a second lens unit fourth lens L13, and a second lens unit fifth lens L14 (reduction-side image forming surface-side lens) toward the liquid crystal panel 18 side from the intermediate image 30 side. The cross dichroic prism 19 is disposed between the second lens unit fifth lens L14 and the liquid crystal panel 18.

The second lens unit first lens L10 is a positive lens. The second lens unit third lens L12 and the second lens unit fourth lens L13 are bonded to constitute the second lens unit cemented lens SL2. The second lens unit fifth lens L14 is a positive lens.

As illustrated in FIG. 10, in the projection optical system 3C, a principal ray of an off-axis light beam passing between the first lens unit LU1 and the second lens unit LU2 which are positioned on both sides interposing the intermediate image 30 therebetween approaches an optical axis toward the first lens unit LU1 side from the second lens unit LU2 side. A focusing position P of the off-axis light in the intermediate image 30 approaches the second lens unit LU2 outward the axis.

Here, in a case where the size of projection onto the screen S is changed by the projection optical system 3C, focusing for bringing the screen S into focus is performed by relatively moving a first moving lens group MG1 positioned next to the intermediate image 30 side of the first lens unit first lens L1 and a second moving lens group MG2 positioned next to the intermediate image 30 side of the first moving lens group MG1 in a direction of an optical axis L in a state where the first lens unit first lens L1 is fixed.

The first moving lens group MG1 includes the first lens unit second lens L2, the first lens unit third lens L3, the first lens unit fourth lens L4, and the first lens unit fifth lens L5. The first moving lens group MG1 includes two negative lenses from the first lens unit first lens L1 side. That is, the first lens unit second lens L2 and the first lens unit third lens L3 are negative lenses.

The second moving lens group MG2 includes the first lens unit cemented lens SL1 and the first lens unit ninth lens L9. The second moving lens group MG2 includes at least one positive lens. In the present example, the first lens unit sixth lens L6, the first lens unit eighth lens L8, and the first lens unit ninth lens L9 are positive lenses.

Here, when a focal length is set to be |f|, a maximum angle of view (half angle of view) is set to be ω, an F number is set to be FNo, and an effective image circle diameter is set to be φ, data of the projection optical system 3C is as follows.

$|f|=2.85$ $\omega=70.55°$ $FNo=2$ $\phi=16.3$

In addition, lens data of the projection optical system 3C is as illustrated in FIG. 11. In FIG. 11, the column of a lens number is a sign attached to each lens in FIG. 10. A surface having a surface number with * is an aspherical surface. R denotes a radius of curvature. In addition, d denotes an axial surface distance (mm) (a lens thickness or a lens distance). Further, nd denotes a refractive index. In addition, vd denotes an Abbe number. An axial surface distance A is a distance between the screen S and the first lens unit first lens L1. An axial surface distance B is a distance between the first lens unit first lens L1 and the first moving lens group MG1. An axial surface distance C is a distance between the first moving lens group MG1 and the second moving lens group MG2. An axial surface distance D is a distance between the second moving lens group MG2 and the second lens unit LU2. The axial surface distance A changes depending on the size of projection, and the axial surface distances B, C, and D change due to focusing in a case where the size of projection is changed.

The axial surface distances A, B, C, and D in a case where focusing is performed by changing the size of projection are as follows. Meanwhile, the position of each lens element after focusing when the axial surface distance A which is a distance between the first lens unit first lens L1 and the screen S is set to 500 mm is set to be a position 1, the position of each lens element when the axial surface distance A is set to 400 mm is set to be a position 2, and the position of each lens element when the axial surface distance A is set to 700 mm is set to be a position 3.

|   | Position 1 | Position 2 | Position 3 |
|---|---|---|---|
| A | 500 | 400 | 700 |
| B | 9.690 | 9.836 | 9.500 |
| C | 2.156 | 2.000 | 2.360 |
| D | 40.870 | 40.880 | 40.856 |

Next, pieces of aspherical data of aspherical surfaces (surface numbers 1 and 2) of the first lens unit first lens L1 and aspherical surfaces (surface numbers 15 and 16) of the first lens unit ninth lens L9 are as illustrated in FIG. 12. In FIG. 12, in the aspherical surfaces (surface numbers 1 and 2) of the first lens unit first lens L1, coefficients of an odd-order aspherical surface type for specifying an aspherical shape are shown. In the aspherical surfaces (surface numbers 15 and 16) of the first lens unit ninth lens L9, coefficients of an even-order aspherical surface type for specifying an aspherical shape are shown.

Here, the projection optical system 3C in the present example satisfies the following Conditional Expression (1) and Conditional Expression (2) when the number of lens elements of the first lens unit LU1 and the number of lens elements of the second lens unit LU2 are set to be Num1 and Num2, respectively.

$$Num2 \le 7 \quad (1)$$

$$1.5 \le Num1/Num2 \le 2.5 \quad (2)$$

That is, relations of Num1=9, Num2=5, 1.5≤(Num1/Num2=1.8)≤2.5 are established.

The projection optical system 3C satisfies Conditional Expression (1), and thus an upper limit of the number of lens elements of the second lens unit LU2 is specified. Therefore, the number of lens elements of the second lens unit LU2 is easily suppressed. In addition, Conditional Expression (1) and Conditional Expression (2) are satisfied, and thus an upper limit of the number of lens elements of the whole lens system of the projection optical system 3C is specified. Accordingly, it is easy to suppress the number of lens elements and the total length of the whole lens system. In the present example, the number of lens elements of the whole lens system of the projection optical system 3C is 14. In addition, Conditional Expression (2) is satisfied, and thus the number of elements of the first lens unit LU1 becomes larger than that of the second lens unit LU2. Therefore, it becomes easy to correct curvature of field and distortion aberration, occurring on the second lens unit LU2 side, on the first lens unit LU1 side by suppressing the number of lens elements of the second lens unit LU2.

In addition, the first lens unit LU1 includes at least two aspherical lenses. In the present example, the first lens unit first lens L1 and the first lens unit ninth lens L9 are aspherical lenses. Thereby, it is easy to correct aberration, occurring on the second lens unit LU2 side, on the first lens unit LU1 side. In addition, the first lens unit first lens L1 which is an aspherical lens is disposed on the first lens unit LU1 side closest to the screen S side, and thus it is possible to satisfactorily correct the distortion aberration. Further, the first lens unit ninth lens L9 which is an aspherical lens is disposed on the first lens unit LU1 side closest to the intermediate image 30 side, and thus it is possible to satisfactorily correct the curvature of field. In addition, two aspherical lenses are made of a resin (plastic lens), and thus it is possible to suppress the manufacturing cost of the projection optical system 3C as compared with a case where a glass lens is used.

Further, in the present example, the first lens unit cemented lens SL1 formed by bonding three lenses (the first lens unit sixth lens L6, the first lens unit seventh lens L7, and the first lens unit eighth lens L8) to each other is provided. In addition, the first lens unit cemented lens SL1 satisfies all of the following Conditional Expression (3) to Conditional Expression (6) when a refractive index and an Abbe number of the first lens unit sixth lens L6 are respectively set to be n1 and vd1, a refractive index and an Abbe number of the first lens unit seventh lens L7 are respectively set to be n2 and vd2, and a refractive index and an Abbe number of the first lens unit eighth lens L8 are respectively set to be n3 and vd3.

$$n2-n1>0.15 \quad (3)$$

$$n2-n3>0.2 \quad (4)$$

$$vd1-vd2>30 \quad (5)$$

$$vd3-vd2>30 \quad (6)$$

That is, the values of Conditional Expression (3) to Conditional Expression (6) are as follows.

$$n2-n1=(1.85478-1.61801)=0.23677>00.2$$

$$n2-n3=(1.85478-1.61801)=0.23677>00.2$$

$$vd1-vd2=(63.33-24.8)=38.53>30$$

$$vd3-vd2(63.33-24.8)=38.53>30$$

When the refractive indexes and the Abbe numbers of the three lenses constituting the first lens unit cemented lens SL1 satisfy Conditional Expression (3) to Conditional Expression (6), it is possible to satisfactorily correct magnification chromatic aberration. In addition, the projection optical system 3C includes the first lens unit cemented lens SL1 formed by bonding the three lenses to each other, and thus it is possible to prevent eccentricity and collapse of each lens element as compared with a case where the three lenses are disposed individually. Thereby, it is possible to suppress eccentric occurrence of blur and flare.

Further, in the present example, the first lens unit fourth lens L4 having the smallest lens effective diameter among the lens elements constituting the first lens unit LU1 is a negative lens having a concave surface on the screen S side. When the focal length of the first lens unit LU1 is set to be f1U and the focal length of the first lens unit fourth lens L4 is set to be f2, the following Conditional Expression (7) is satisfied.

$$-50<f2/f1U<-5 \quad (7)$$

That is, the value of Conditional Expression (7) is as follows.

$$-50<f2/f1U=(-69.09/4)=-17.272<-5$$

When the first lens unit fourth lens L4 which is a minimum effective diameter lens of the first lens unit LU1 is set to be a negative lens having a concave surface on the screen S side, it becomes easy to take in a required amount of light while suppressing the increase of the total length of the second lens unit LU2 and a lens diameter of each lens element constituting the second lens unit LU2. In addition, when Conditional Expression (7) is satisfied, it becomes easy to suppress performance deterioration during focusing while suppressing the increase of the lens diameter of the first lens unit fourth lens L4 which is a minimum effective diameter lens. That is, when Conditional Expression (7) exceeds a lower limit, it is necessary to increase the lens diameter of the first lens unit fourth lens L4 which is a minimum effective diameter lens in order to take in a required amount of light. In addition, when Conditional Expression (7) exceeds the lower limit, a fluctuation in astigmatism tends to be increased during focusing. When Conditional Expression (7) exceeds an upper limit, it becomes difficult to correct the surrounding coma aberration.

Further, in the present example, a principal ray of an off-axis light beam between the second lens unit LU2 and the first lens unit LU1 approaches the optical axis L toward the first lens unit LU1 side from the second lens unit LU2 side. Thereby, it is easy to correct distortion aberration, occurring on the first lens unit LU1 side, on the second lens unit LU2 side. In addition, a focusing position of off-axis light in the intermediate image 30 approaches the second lens unit LU2 outward the axis. Thereby, it becomes easier to correct the distortion aberration, occurring on the first lens unit LU1 side, on the second lens unit LU2 side.

Further, in the present example, the second lens unit first lens L10 positioned closest to the intermediate image 30 side and the second lens unit fifth lens L14 positioned closest to the liquid crystal panel side, among the lens elements of the second lens unit LU2, are positive lenses. When a refractive index of d-line of the second lens unit first lens L10 is set to be nc1, a refractive index of d-line of the second lens unit fifth lens L14 is set to be nc2, and a partial dispersion ratio of the second lens unit fifth lens L14 is set to be $\theta g,F$, the following Conditional Expression (8) to Conditional Expression (10) are satisfied.

$$nc1>1.8 \quad (8)$$

$$nc2>1.8 \quad (9)$$

$$\theta g,F>0.58 \quad (10)$$

That is, the values of Conditional Expression (8) to Conditional Expression (10) are as follows.

$$nc1=1.84666>1.8$$

$$nc2=1.80610>1.8$$

$$\theta g,F=0.5883>0.58$$

Since Conditional Expression (8) and Conditional Expression (9) are satisfied, a refractive index is set to be relatively high in the second lens unit first lens L10 and the second lens unit fifth lens L14. Therefore, even when the number of lens elements of the second lens unit LU2 is reduced, it is easy to form the intermediate image 30. Here, in a case where the refractive indexes of the second lens unit first lens L10 and the second lens unit fifth lens L14 are increased, chromatic aberration tends to occur in the second lens unit LU2. On the other hand, when the partial dispersion ratio of the second lens unit fifth lens L14 satisfies Conditional Expression (10), it is possible to suppress the occurrence of magnification chromatic aberration and axial chromatic aberration in the second lens unit LU2.

Further, in the present example, when an absolute value of a focal length of d-line of the whole lens system of the projection optical system 3C is set to be |f| and a back focus air-converted value is set to be BF, the following Conditional Expression (11) is satisfied.

$$BF/|f|>6 \quad (11)$$

That is, the value of Conditional Expression (7) is as follows.

$$BF/|f|=(26.262/|2.85|)=9.2>6$$

Since Conditional Expression (7) is satisfied, the projection optical system 3C is a wide-angle lens system having a half angle of view of 60 degrees or greater and a long back focus.

Figure 13:
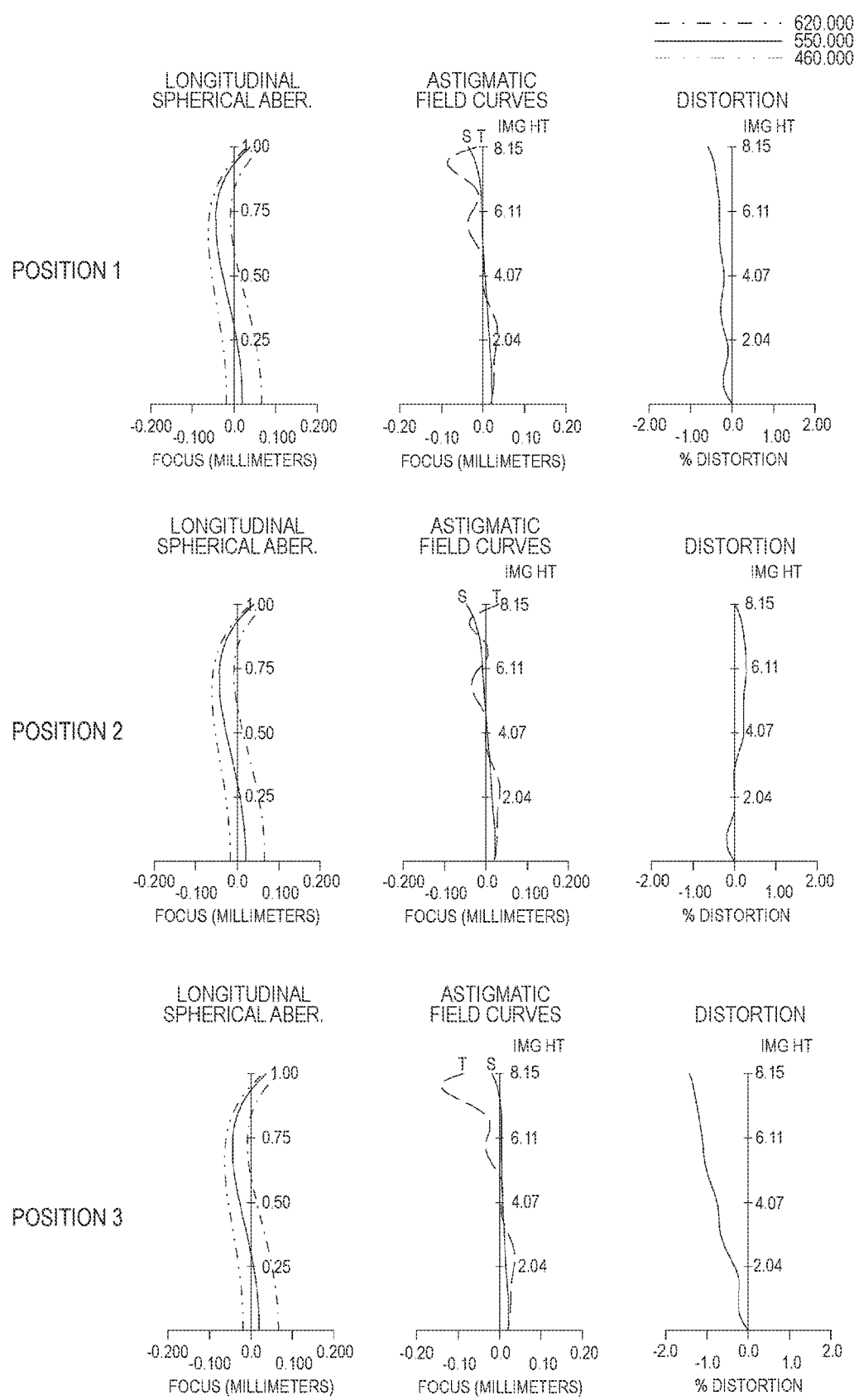
FIG. 13 is a diagram illustrating aberration of the projection optical system according to Example 3.

The upper figure in FIG. 13 is an aberration diagram (spherical aberration, astigmatism, and distortion aberration) in a case where the lens elements of the projection optical system 3C are at the position 1, the middle figure in FIG. 13 is an aberration diagram (spherical aberration, astigmatism, and distortion aberration) in a case where the lens elements of the projection optical system 3C are at the position 2, and the lower figure in FIG. 13 is an aberration diagram (spherical aberration, astigmatism, and distortion aberration) in a case where the lens elements of the projection optical system 3C are at the position 3. As illustrated in FIG. 13, in the projection optical system 3C, spherical aberration, astigmatism, and distortion aberration are satisfactorily corrected.

Meanwhile, in the above-described example, lenses having an aspherical surface in the first lens unit LU1 are two lenses of the first lens unit first lens L1 and the first lens unit ninth lens L9, but other lenses may have an aspherical surface in the first lens unit LU1, in addition to these two lenses.

In addition, when the projection optical system 3C is incorporated into the projector 1, it is possible to dispose a mirror between the lens elements and bend a light path (optical axis L) therebetween.

The entire disclosure of Japanese Patent Application No. 2017-226534, filed on Nov. 27, 2017 is expressly incorporated by reference herein.

What is claimed is:

1. A projection optical system comprising:
a first lens unit that conjugates an enlargement-side image forming surface positioned on an enlargement side and an intermediate image; and
a second lens unit that conjugates the intermediate image and a reduction-side image forming surface positioned on a reduction side,
wherein the first lens unit includes at least two aspherical lenses and a cemented lens formed by bonding three lenses to each other,
the cemented lens includes a first positive lens, a negative lens, and a second positive lens toward a side of the intermediate image from a side of the enlargement-side image forming surface, and
all of the following Conditional Expression (1) to Conditional Expression (6) are satisfied when the number of lens elements of the first lens unit is set to be Num1, the number of lens elements of the second lens unit is set to be Num2, a refractive index of the first positive lens is set to be n1, an Abbe number of the first positive lens is set to be vd1, a refractive index of the negative lens is set to be n2, an Abbe number of the negative lens is set to be vd2, a refractive index of the second positive lens is set to be n3, and an Abbe number of the second positive lens is set to be vd3:

$$\text{Num2} \leq 7 \tag{1}$$

$$1.5 \leq \text{Num1}/\text{Num2} \leq 2.5 \tag{2}$$

$$n2-n1>0.15 \tag{3}$$

$$n2-n3>0.2 \tag{4}$$

$$vd1-vd2>30 \tag{5}$$

$$vd3-vd2>30 \tag{6}.$$

2. The projection optical system according to claim 1, wherein a minimum effective diameter lens having a smallest lens effective diameter, among the lens elements of the first lens unit, is a negative lens having a concave surface on the side of the enlargement-side image forming surface, and the following Conditional Expression (7) is satisfied when a focal length of the first lens unit is set to be f1U and a focal length of the minimum effective diameter lens is set to be f2:

$$-50<f2/f1U<-5 \tag{7}.$$

3. The projection optical system according to claim 1, wherein a principal ray of an off-axis light beam between the second lens unit and the first lens unit approaches an optical axis toward the first lens unit side from the second lens unit side.

4. The projection optical system according to claim 1, wherein a focusing position of off-axis light in the intermediate image approaches the second lens unit outward an axis.

5. The projection optical system according to claim 1, wherein the first lens unit includes two aspherical lenses, and
the two aspherical lenses are made of a resin and are respectively disposed on the first lens unit side closest to the side of the enlargement-side image forming surface and on the first lens unit side closest to the side of the intermediate image.

6. The projection optical system according to claim 1, further comprising:
a first moving lens group that is positioned next to a first lens unit first lens positioned closest to the side of the enlargement-side image forming surface among the lens elements of the first lens unit; and
a second moving lens group that is positioned next to the first moving lens group on the side of the intermediate image of the first moving lens group,
wherein the first moving lens group includes two or more negative lenses from the first lens unit first lens side,
the second moving lens group includes at least one positive lens, and
focusing is performed by fixing the first lens unit first lens and relatively moving the first moving lens group and the second moving lens group on an optical axis when a size of projection onto the enlargement-side image forming surface is changed.

7. The projection optical system according to claim 1, wherein an intermediate image-side lens positioned closest to the side of the intermediate image and a reduction-side image forming surface-side lens positioned closest to the side of the reduction-side image forming surface, among the lens elements of the second lens unit, are positive lenses, and
all of the following Conditional Expression (8) to Conditional Expression (10) are satisfied when refractive indexes of d-line of the intermediate image-side lens and the reduction-side image forming surface-side lens are respectively set to be nc1 and nc2 and a partial dispersion ratio of the reduction-side image forming surface-side lens is set to be θg,F:

$$nc1>1.8 \tag{8}$$

$$nc2>1.8 \tag{9}$$

$$\theta g,F>0.58 \tag{10}.$$

8. The projection optical system according to claim 1, wherein the following Conditional Expression (11) is satisfied when an absolute value of a focal length of d-line of a whole lens system is set to be and a back focus air-converted value is set to be BF:

$$BF/|f|>6 \tag{11}$$

9. A projection type image display device comprising:
the projection optical system according to claim 1; and
an image display element that displays an image on the reduction-side image forming surface.

10. A projection type image display device comprising:
the projection optical system according to claim 2; and
an image display element that displays an image on the reduction-side image forming surface.

11. A projection type image display device comprising:
the projection optical system according to claim 3; and
an image display element that displays an image on the reduction-side image forming surface.

12. A projection type image display device comprising:
the projection optical system according to claim 4; and
an image display element that displays an image on the reduction-side image forming surface.

13. A projection type image display device comprising:
the projection optical system according to claim 5; and
an image display element that displays an image on the reduction-side image forming surface.

14. A projection type image display device comprising:
the projection optical system according to claim 6; and
an image display element that displays an image on the reduction-side image forming surface.

15. A projection type image display device comprising:
the projection optical system according to claim 7; and
an image display element that displays an image on the reduction-side image forming surface.

16. A projection type image display device comprising:
the projection optical system according to claim 8; and
an image display element that displays an image on the reduction-side image forming surface.

* * * * *